US012573749B2

(12) United States Patent
Zhang et al.

(10) Patent No.: US 12,573,749 B2
(45) Date of Patent: Mar. 10, 2026

(54) ANTENNA COMBINATION SYSTEM AND TERMINAL DEVICE

(71) Applicant: Honor Device Co., Ltd., Shenzhen (CN)

(72) Inventors: Aofang Zhang, Shenzhen (CN); Shaojie Chu, Shenzhen (CN); Lei Li, Shenzhen (CN); Kunpeng Wei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 399 days.

(21) Appl. No.: 18/547,455

(22) PCT Filed: May 6, 2022

(86) PCT No.: PCT/CN2022/091177
§ 371 (c)(1),
(2) Date: Aug. 22, 2023

(87) PCT Pub. No.: WO2023/015979
PCT Pub. Date: Feb. 16, 2023

(65) Prior Publication Data
US 2024/0145910 A1 May 2, 2024

(30) Foreign Application Priority Data
Aug. 9, 2021 (CN) .......................... 202110909423.5

(51) Int. Cl.
*H04B 7/02* (2018.01)
*H01Q 1/24* (2006.01)
(Continued)

(52) U.S. Cl.
CPC ............. *H01Q 1/523* (2013.01); *H01Q 1/243* (2013.01); *H01Q 1/48* (2013.01); *H04B 1/0064* (2013.01);
(Continued)

(58) Field of Classification Search
CPC .......... H01Q 1/523; H01Q 1/243; H01Q 1/48; H01Q 1/245; H01Q 1/521; H01Q 5/335;
(Continued)

(56) References Cited

U.S. PATENT DOCUMENTS 7,327,320 B2 * 2/2008 Dejean ..................... H01Q 1/42
343/702
7,369,879 B1 5/2008 Steigerwald et al.
(Continued)

FOREIGN PATENT DOCUMENTS

CN 105655709 A 6/2016
CN 106921038 A 7/2017
(Continued)

*Primary Examiner* — Andrew Wendell
(74) *Attorney, Agent, or Firm* — Conley Rose, P.C.

(57) ABSTRACT

An antenna combination system and a terminal device. The antenna combination system includes a first antenna and a second antenna having a distance less than a first preset threshold. The first antenna includes a first radiation branch and a first feed point, a feed point of the second antenna is arranged on a side away from the first feed point, and a side of the first radiation branch away from the first feed point is grounded. The first feed point is arranged on a side close to the second antenna, and the length of the first radiation branch is an odd multiple of $(\frac{1}{2})\lambda$. In a case that the second antenna transmits a signal in a first frequency band, a first signal and a second signal that cancel each other are coupled from the second antenna to the first antenna.

20 Claims, 13 Drawing Sheets

(51) Int. Cl.

| | | |
|---|---|---|
| *H01Q 1/48* | (2006.01) | |
| *H01Q 1/52* | (2006.01) | |
| *H04B 1/00* | (2006.01) | |
| *H04B 1/3827* | (2015.01) | |
| *H04B 7/0404* | (2017.01) | |

(52) U.S. Cl.
CPC ......... *H04B 1/3838* (2013.01); *H04B 7/0404* (2013.01)

(58) Field of Classification Search
CPC .......... H01Q 5/40; H01Q 9/0421; H01Q 9/42; H01Q 1/2266; H01Q 1/2291; H01Q 1/242; H01Q 1/36; H01Q 1/50; H01Q 21/00; H01Q 21/0006; H04B 1/0064; H04B 1/3838; H04B 7/0404; H04B 7/02; H04B 7/024; H04B 1/04; H04B 1/16; H04B 1/40
See application file for complete search history.

(56) References Cited

U.S. PATENT DOCUMENTS

| | | | | |
|---|---|---|---|---|
| 9,748,649 | B2 * | 8/2017 | Park | H01Q 21/28 |
| 10,164,330 | B2 | 12/2018 | Wu et al. | |
| 11,367,967 | B2 * | 6/2022 | Ren | H01Q 1/521 |
| 11,870,413 | B2 | 1/2024 | Li | |
| 11,909,130 | B2 | 2/2024 | Li | |
| 11,923,624 | B2 | 3/2024 | Tachibana | |
| 2003/0169209 | A1 * | 9/2003 | Ohara | H01Q 1/242 |
| | | | | 343/702 |

| | | | | |
|---|---|---|---|---|
| 2005/0088359 | A1 * | 4/2005 | Lynch | H01Q 19/32 |
| | | | | 343/700 MS |
| 2012/0013519 | A1 | 1/2012 | Mikael et al. | |
| 2017/0162948 | A1 * | 6/2017 | Wong | H01Q 13/10 |
| 2018/0159226 | A1 * | 6/2018 | Huang | H01Q 1/48 |
| 2019/0027822 | A1 | 1/2019 | Ayala Vazquez et al. | |
| 2019/0214707 | A1 | 7/2019 | Kim et al. | |
| 2020/0044329 | A1 * | 2/2020 | Wu | H01Q 1/36 |
| 2020/0058992 | A1 | 2/2020 | Wu et al. | |
| 2021/0126372 | A1 * | 4/2021 | Duan | H01Q 5/307 |
| 2021/0367356 | A1 | 11/2021 | Nishimoto et al. | |
| 2022/0209420 | A1 * | 6/2022 | Li | H01Q 1/48 |

FOREIGN PATENT DOCUMENTS

| | | | | | |
|---|---|---|---|---|---|
| CN | 107959117 | A | 4/2018 | | |
| CN | 109346833 | A | 2/2019 | | |
| CN | 109546311 | A | 3/2019 | | |
| CN | 109546337 | A | 3/2019 | | |
| CN | 109659693 | A | 4/2019 | | |
| CN | 109861000 | A | 6/2019 | | |
| CN | 110350312 | A | 10/2019 | | |
| CN | 112531343 | A | 3/2021 | | |
| CN | 113013593 | A | 6/2021 | | |
| CN | 113193360 | A | 7/2021 | | |
| CN | 113764888 | A | 12/2021 | | |
| EP | 3413584 | A1 * | 12/2018 | ............ | H04R 25/00 |
| JP | 2002290150 | A * | 10/2002 | ............ | H01Q 23/00 |
| JP | 2015122557 | A | 7/2015 | | |
| JP | WO2019107553 | A1 * | 6/2019 | .............. | H01Q 9/42 |
| WO | 2015052838 | A1 | 4/2015 | | |
| WO | 2021153215 | A1 | 8/2021 | | |

* cited by examiner (a)                                    (b)

ANTENNA COMBINATION SYSTEM AND TERMINAL DEVICE

CROSS-REFERENCE TO RELATED APPLICATIONS

This is a U.S. National Stage of International Application No. PCT/CN2022/091177 filed on May 6, 2022, which claims priority to Chinese Patent Application 202110909423.5, filed with the China National Intellectual Property Administration on Aug. 9, 2021, both of which are incorporated herein by reference in their entireties.

TECHNICAL FIELD

Embodiments of this application relate to the field of antenna technologies, and in particular, to an antenna combination system and a terminal device.

BACKGROUND

With the development of communication technologies, more and more antennas are required by terminal devices such as tablet computers and mobile phones. For example, a terminal device is provided with two antennas, and the two antennas work in a same frequency band. In a case that the distance between the two antennas is relatively close, a signal of one antenna is typically coupled to the other antenna due to a signal coupling effect. Because operating frequency bands of the two antennas are the same, the coupled signal cannot be filtered out by using a filter circuit, resulting in a low degree of isolation between the two antennas, which affects the communication performance.

In view of the degree of isolation problem, in a case that two antennas in a same operating frequency band are laid, a distance between the two antennas is typically set to be relatively large, so as to form isolation in a physical space, thereby avoiding the low degree of isolation due to a short distance between the antennas.

However, different antennas on a same terminal device typically share a wireless communication (Wi-Fi) chip. In a case that a distance between the two antennas is set far away and the Wi-Fi chip is laid out near one of the antennas, the Wi-Fi chip is bound to be away from the other antenna. In this way, an insertion loss between the other antenna and the Wi-Fi chip is relatively large, which affects the antenna performance.

SUMMARY

Embodiments of this application provide an antenna combination system and a terminal device, which can improve the antenna performance.

In a first aspect, an antenna combination system is provided, including a first antenna and a second antenna, where a distance between the first antenna and the second antenna is less than a first preset threshold; the first antenna includes a first radiation branch and a first feed point, the first feed point is arranged on a side close to the second antenna, a feed point of the second antenna is arranged on a side away from the first feed point, and the first radiation branch is grounded on the side away from the first feed point; an operating frequency band of the first antenna and an operating frequency band of the second antenna both include a first frequency band; and a length of the first radiation branch is an odd multiple of $(\frac{1}{2})\lambda$, where $\lambda$ is a wavelength in a medium corresponding to the first frequency band.

In an embodiment of this application, the antenna combination system includes a first antenna and a second antenna having a distance less than a first preset threshold. The first antenna includes a first radiation branch and a first feed point, a feed point of the second antenna is arranged on a side away from the first feed point, and a side of the first radiation branch away from the first feed point is grounded. The first feed point is arranged on a side close to the second antenna, and the length of the first radiation branch is an odd multiple of $(\frac{1}{2})\lambda$ an operating frequency band of the first antenna and an operating frequency band of the second antenna include a first frequency band. In a case that the second antenna transmits a signal, a first signal and a second signal having a phase difference of $(180\pm X)°$ are coupled from the second antenna to the first antenna. Due to the phase difference of $(180\pm X)°$ between the first signal and the second signal, the first signal and the second signal can cancel each other, which is equivalent to that a total signal obtained after superimposition of signals coupled from the second antenna to the first antenna is quite weak. In other words, in a case that the distance between the first antenna and the second antenna is relatively small, mutual interference between signals of the first antenna and the second antenna in the first frequency band can be reduced by using the antenna combination system, thereby increasing the degree of isolation between the first antenna and the second antenna. Further, in a case that the first antenna and the second antenna are Wi-Fi antennas, since the distance between the first antenna and the second antenna is less than the first preset threshold, by reasonably disposing the Wi-Fi chip, the distance between the second antenna and the Wi-Fi chip can become relatively close while the distance between the first antenna and the Wi-Fi chip is relatively close, so that both the signal insertion loss between the first antenna and the Wi-Fi chip and the signal insertion loss between the second antenna and the Wi-Fi chip are relatively small.

In an embodiment, in a case that the second antenna transmits a signal in the first frequency band, a first signal and a second signal that are different are coupled from the second antenna to the first antenna, and a phase difference between the first signal and the second signal is $(180\pm X)°$, where X is less than a second preset threshold; and in a case that the second antenna transmits a signal, the first signal is a signal coupled to the first antenna through a first path, the second signal is a signal coupled to the first antenna through a second path, the first path is a path to the first feed point through the first radiation branch, and the second path is a path to the first feed point through the first radiation branch.

In an embodiment, in a case that the first antenna transmits the signal in the first frequency band, a third signal and a fourth signal are coupled from the first antenna to the second antenna, and a phase difference between the third signal and the fourth signal is $(180\pm Y)°$, where Y is less than a third preset threshold; the third signal is a signal coupled to the second antenna through a third path, where the third path is a path from the first feed point to the second antenna through the first radiation branch; and the fourth signal is a signal coupled to the second antenna through a fourth path, where the fourth path is a path from the first feed point to the second antenna without passing through the first radiation branch.

In an embodiment, the first antenna further includes a first matching circuit, where the first matching circuit is configured to perform impedance matching and/or operating frequency tuning on the first antenna, and the second antenna further includes a second matching circuit, where the second matching circuit is configured to perform impedance matching and/or operating frequency tuning on the second antenna.

In this embodiment of this application, by performing impedance matching and/or operating frequency tuning on the first antenna by using the first matching circuit, the performance of the first antenna can be improved. By performing impedance matching and/or operating frequency tuning on the second antenna by using the second matching circuit, the performance of the second antenna can be improved.

In an embodiment, a side of the first radiation branch away from the first feed point is grounded by a third matching circuit; and the third matching circuit is configured to adjust a phase of the first signal.

In this embodiment of this application, by adjusting the phase of the first signal through the third matching circuit, the phase difference between the first signal and the second signal may become closer to 180°, which is equivalent to improving a mutual cancellation amplitude between the first signal and the second signal, further reducing mutual interference between signals of the first antenna and the second antenna in the first frequency band, and further increasing the degree of isolation between the first antenna and the second antenna.

In an embodiment, the first preset threshold is ¼λ.

In this embodiment of this application, in a case that the distance between the first antenna and the second antenna is a value in (0, ¼λ], a signal amplitude A1 of the first signal is the same as a signal amplitude A2 of the second signal; and in a case that the phase difference between the first signal and the second signal is 180° and A1=A2, the first signal and the second signal may fully cancel each other, which can effectively reduce mutual interference between the first antenna and the second antenna, and improve the degree of isolation between the first antenna and the second antenna.

In an embodiment, the operating frequency band of the second antenna further includes a second frequency band; the first antenna includes a filter circuit; and the filter circuit is configured to filter a signal in the second frequency band.

In this embodiment of this application, in a case that the first antenna works in the first frequency band and the second antenna works in the first frequency band and the second frequency band, the signal coupled to the first antenna when the second antenna works in the second frequency band is filtered by using the filter circuit provided on the first antenna for filtering the signal in the second frequency band, thereby reducing the influence of the signal in the second frequency band on the coupling of the first antenna, further avoiding the interference of the second antenna on the first antenna, and increasing the degree of isolation between the first antenna and the second antenna.

In an embodiment, the first radiation branch is connected to a metal ground by an integral forming method.

In this embodiment of this application, by generating the first radiation branch and the metal ground at one time by the integral forming method, the reliability of grounding of the first radiation branch can be improved.

In an embodiment, the first antenna is connected to a first specific absorption rate SAR sensor; and the first SAR sensor is configured to reduce transmit power of the first antenna upon detection of that a distance between a living body and the first radiation branch is less than a fourth preset threshold.

In an embodiment, the first SAR sensor is connected to a first side of the first radiation branch by a first inductor, and the first side refers to a side of the first radiation branch connected to the first feed point; the first feed point is connected to the first radiation branch by a first capacitor; and the side of the first radiation branch away from the first feed point is grounded by a second capacitor.

In this embodiment of this application, by using the first SAR sensor connected to the first antenna, upon detection of that the distance between the living body and the first radiation branch is less than the fourth preset threshold, the transmit power of the first antenna is reduced, so that when a human body approaches the first radiation branch, the intensity of signals radiated by the first antenna is reduced, that is, the intensity of radiation signals received by the human body is reduced, thereby protecting the human body from damage caused by receiving excessive radiation signals.

In an embodiment, the second antenna includes a second radiation branch; the second antenna is connected to a second specific absorption rate SAR sensor; and the second SAR sensor is configured to reduce transmit power of the second antenna upon detection of that a distance between a living body and the second radiation branch is less than a fifth preset threshold.

In an embodiment, the second antenna further includes a second feed point; the second SAR sensor is connected to a second side of the second radiation branch by a second inductor, and the second side refers to a side of the second radiation branch connected to the second feed point; and the second feed point is connected to the second radiation branch through a third capacitor.

In a second aspect, a terminal device is provided. The terminal device includes the antenna combination system according to the first aspect.

DESCRIPTION OF EMBODIMENTS

The following clearly and thoroughly describes technical solutions in embodiments of this application with reference to the accompanying drawings. In the descriptions of the embodiments of this application, "/" means "or" unless otherwise specified. For example, A/B may represent A or B. The term "and/or" describes only an association relationship for describing associated objects and represents that three relationships may exist. For example, A and/or B may represent the following three cases: only A exists, both A and B exist, and only B exists. In addition, in the description of the embodiments of this application, "a plurality of" refers to two or more.

The terms "first" and "second" mentioned below are merely intended for a purpose of description, and shall not be understood as an indication or implication of relative importance or implicit indication of the quantity of indicated technical features. Therefore, a feature defined to be "first" or "second" may explicitly or implicitly include one or more features. In the description of the embodiments of this application, unless otherwise stated, "a plurality of" refers to two or more.

With the development of communication technologies, people have higher and higher requirements for the transmission rate. In order to meet people's demand for the transmission rate, the transmission rate can be increased by increasing a throughput rate of a terminal device. The throughput rate is an average rate at which data is successfully delivered over a communication channel (a communication channel) or a node per unit of time, which is typically in a unit of bits per second (bps, bits per second). A higher throughput rate indicates a higher transmission rate of the terminal device. In a possible case, the throughput rate may be increased by increasing the number of antennas on the terminal device. For example, in a case that there is only one antenna on a mobile phone, an upper limit of a communication throughput rate is fixed, and it is difficult to increase the communication throughput rate. By adding one multi-input multi-output (Multi-Input Multi-Output, MIMO) antenna, the upper limit of the throughput rate of the mobile phone can be doubled.

Figure 1:
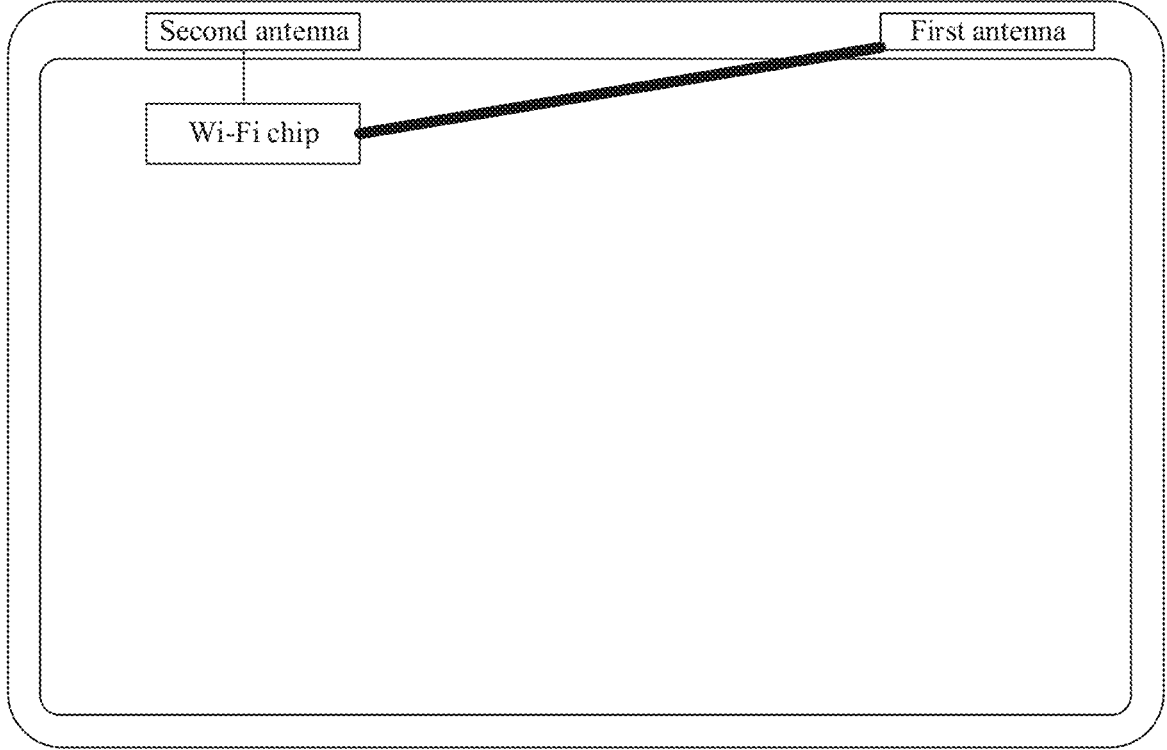
FIG. 1 is a schematic diagram of an antenna layout in a terminal device.

At present, by adding one multi-input multi-output (Multi-Input Multi-Output, MIMO) antenna to the terminal device, the throughput rate of the terminal device can be doubled; in a case that a terminal device includes two or more antennas, the degree of isolation between antennas may be relatively poor due to a relatively short distance between the antennas, which affects the communication performance. In order to avoid signal interference between two or more antennas, the two antennas are typically arranged separately, as shown in FIG. 1. A first antenna is located at the upper right corner of a terminal device, and a second antenna is disposed at the upper left corner of the terminal device, so as to avoid the problem of influence on the antenna performance due to the low degree of isolation between the first antenna and the second antenna. A Wi-Fi chip is arranged near the second antenna and is away from the first antenna, and the first antenna is connected to the Wi-Fi chip through a coaxial line. Because the distance between the first antenna and the Wi-Fi chip is large, the insertion loss between the first antenna and the Wi-Fi chip is relatively large, and the performance of the first antenna is reduced.

In view of this, this application provides an antenna combination system, which can avoid signal interference between antennas while ensuring the antenna performance; in this embodiment of this application, the antenna combination system may include a first antenna and a second antenna, and in a case that the second antenna transmits a signal, a first signal and a second signal having a phase difference of $(180 \pm X)°$ may be coupled from the second antenna to the first antenna; and through superposition and mutual cancellation of the first signal and the second signal, and a self-decoupling function of the first antenna is implemented, thereby avoiding the interference of the signal of the second antenna on the first antenna, and increasing the degree of isolation between the first antenna and the second antenna. Similarly, in a case that the first antenna transmits a signal, a third signal and a fourth signal having a phase difference of $(180 \pm Y)°$ may be coupled from the first antenna to the second antenna. The third signal and the fourth signal are superposed to cancel each other, and the self-decoupling function of the second antenna is implemented. The decoupling principle of the second antenna when the first antenna transmits a signal is the same as that of the first antenna in when the second antenna transmits a signal, which avoids the interference of the signal of the first antenna on the second antenna and improves the degree of isolation between the first antenna and the second antenna; Therefore, the performance of the antenna combination system is improved.

Exemplarily, the antenna combination system according to the embodiments of this application is described in detail below with reference to FIG. 2 to FIG. 16.

Figure 2:
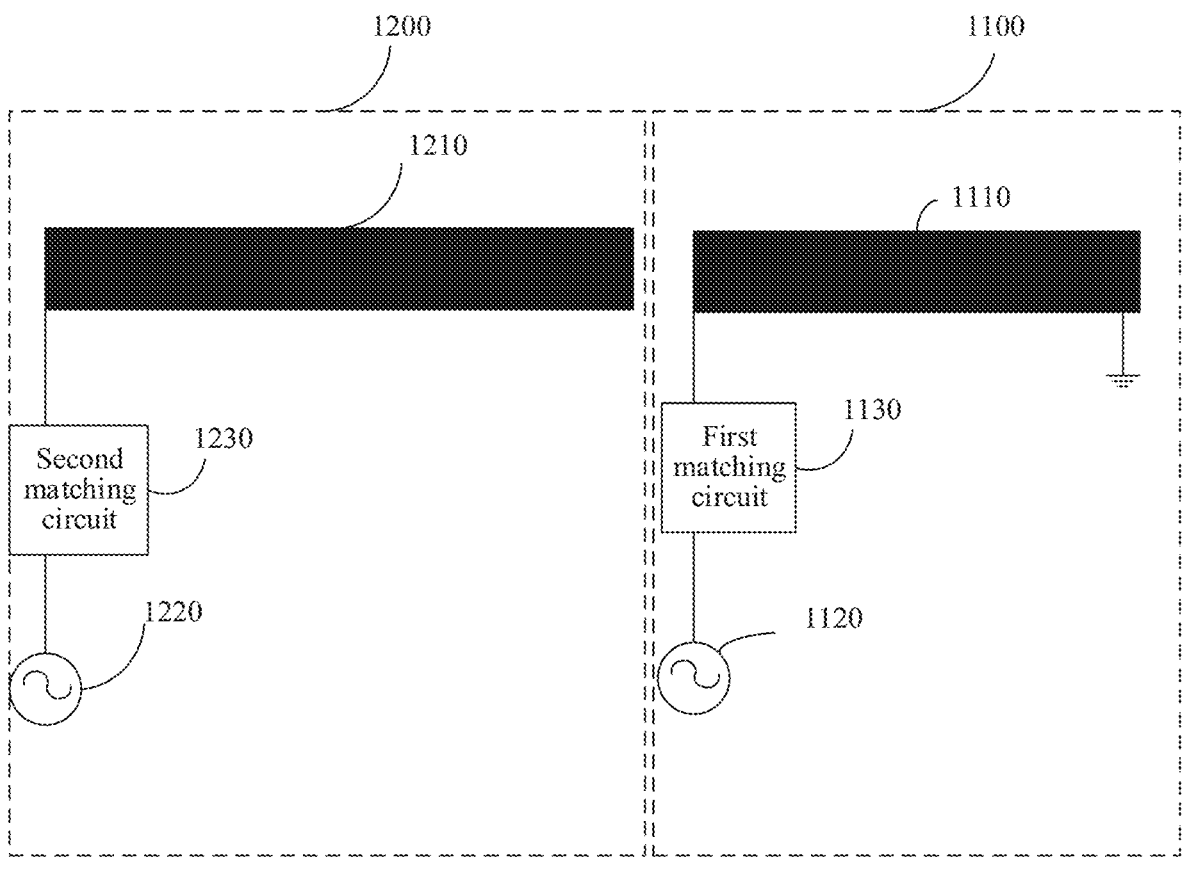
FIG. 2 is a schematic diagram of an antenna combination system according to an embodiment of this application.

FIG. 2 is a schematic diagram of an antenna combination system according to an embodiment of this application.

It should be understood that an antenna combination 1000 shown in FIG. 1 may include a first antenna 1100 and a second antenna 1200. A distance between the first antenna 1100 and the second antenna 1200 is less than a first preset threshold.

In this embodiment of this application, a first signal and a second signal having a phase difference of $(180 \pm X)°$ cancel each other after superimposition, and a self-decoupling function of the first antenna is implemented. For example, as shown in FIG. 1, the first antenna 1100 may include a first radiation branch 1110 and a first feed point 1120. Optionally, the first antenna 1110 further includes a first matching circuit 1130. A side of the first radiation branch 1110 away from the first feed point 1120 is grounded. The first feed point 1120 is arranged on a side close to the second antenna 1200, and a length of the first radiation branch 1110 is about an odd multiple of $(\frac{1}{2})\lambda$. Optionally, the second antenna 1200 may include a second radiation branch 1210, a second feed point 1220, and a second matching circuit 1230. The second feed point 1220 may be arranged on a side away from the first feed point 1120. An operating frequency band of the first antenna 1100 and an operating frequency band of the second antenna 1200 include a first frequency band. In a case that the second antenna 1200 transmits a signal in the first frequency band, a first signal and a second signal are coupled from the second antenna 1200 to the first antenna 1100.

The first antenna 1100 and the second antenna 1200 may refer to apparatuses for transmitting or receiving a signal. For example, the first antenna 1100 and the second antenna 1200 may be apparatuses, on a terminal device, for transmitting or receiving a signal. The first radiation branch 1110 of the first antenna 1100 and the second radiation branch 1210 of the second antenna 1200 may be metal bodies. A length of the first radiation branch 1110 is about an odd multiple of ($\frac{1}{2}$)λ, where λ refers to a wavelength in a medium corresponding to a first frequency band in which the first antenna 1100 and the second antenna 1200 work. It should be understood that, in the field of radio frequency antennas, although the length of a microstrip line (the first radiation branch) theoretically corresponds to a phase change of a signal, due to the influence of factors such as space radiation, in practical applications, there are some differences between the length of the microstrip line and the phase change of the signal, which needs to be adjusted according to an actual situation. That is, in this embodiment of this application, that a length of the first radiation branch 1110 is about an odd multiple of ($\frac{1}{2}$)λ means that the length of the first radiation branch is adjusted on a length that is an odd multiple of ($\frac{1}{2}$)λ. In a case that the first frequency band is 5.3 GHz-5.5 GHz, and a relative dielectric constant εr of a medium is 3, correspondingly, a wavelength in the medium corresponding to the first frequency band may be a wavelength of a center frequency 5.4 GHz of the first frequency band, that is, $\lambda = C/\sqrt{\varepsilon r} = 3.0*108/(5.4*10^9*\sqrt{3}) = 0.032$ m=32 mm.

In a possible case, the first radiation branch 1110 of the first antenna 1100 and the second radiation branch 1210 of the second antenna 1200 may be disposed in a trench on a metal ground 2000.

Figure 3:
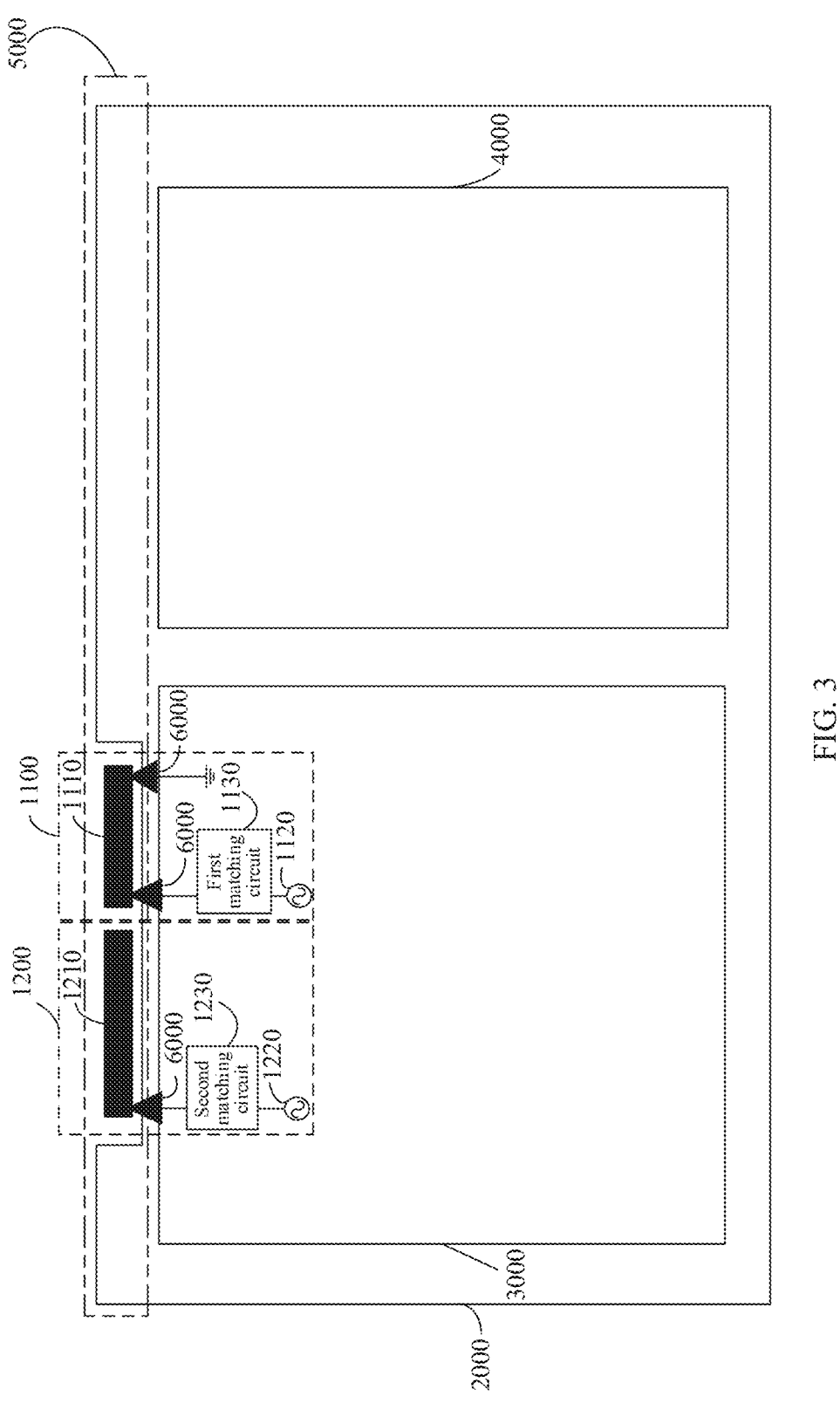
FIG. 3 is a schematic diagram of a location of an antenna combination system according to an embodiment of this application.

For example, as shown in FIG. 3, outer sides of the first radiation branch 1110 and the second radiation branch 1210 are covered with a medium 5000, and part of the first radiation branch 1110 and part of the second radiation branch 1210 are not covered with the medium 5000. Regions that are not covered by the medium 5000 may be configured to be connected to a printed circuit board (Printed Circuit Board, PCB) 3000. For example, the part of the first radiation branch 1110 and the part of the second radiation branch 1210 that are not covered by the medium 5000 are connected to the PCB 3000 by using spring sheets 6000. The first feed point 1120 and the second feed point 1220 may be disposed on the PCB 3000. The first radiation branch 1110 is connected to the first feed point 1120 on the PCB 3000 by using the spring sheet 6000, and the second radiation branch 1210 is connected to the second feed point 1220 provided on the PCB 3000 by using the spring sheet 6000. A side of the first radiation branch 1110 away from the first feed point 1120 is grounded.

In an example, as shown in FIG. 3, in a case that the side of the first radiation branch 1110 away from the first feed point 1120 is grounded, the first radiation branch 1110 may be connected to the PCB 3000 by using the spring sheet 6000, and connected to the metal ground 2000 by using the PCB 3000 for grounding.

Figure 4:
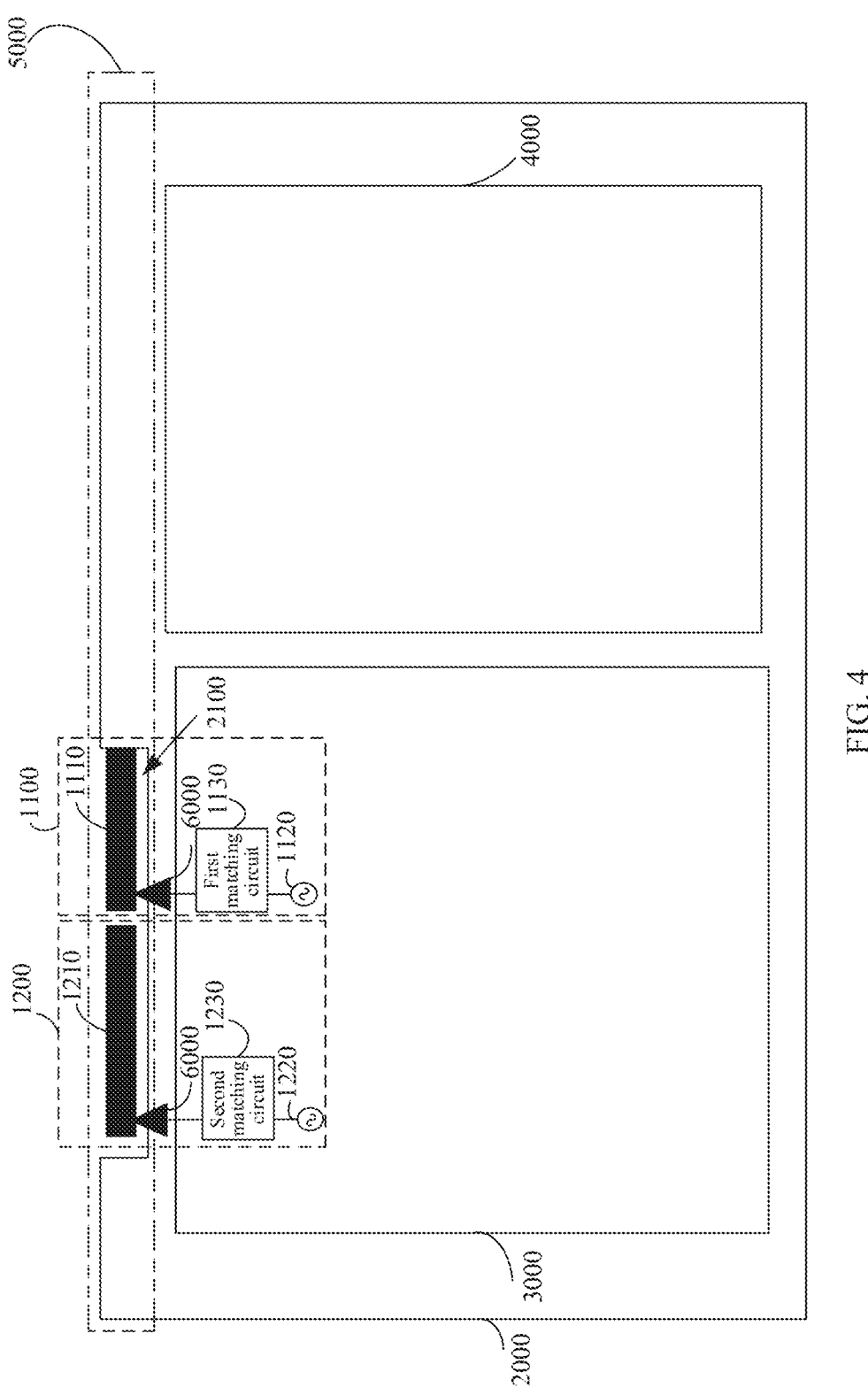
FIG. 4 is a schematic diagram of a location of an antenna combination system according to another embodiment of this application.

In an example, as shown in FIG. 4, the side of the first radiation branch 1110 away from the first feed point 1120 may be directly connected to the metal ground 2000 for grounding. This is not limited in the embodiments of this application.

It should be noted that for manufacturing of the first radiation branch 1110 and the metal ground 2000, the first radiation branch 1110 and the metal ground 2000 may be generated at one time by using an integral forming process. in a case that the first radiation branch 1110 and the metal ground 2000 are generated at one time by integral forming, a gap 2110 exists between the first radiation branch 1110 and the metal ground 2000.

By using the integral forming method, the first radiation branch and the metal ground are generated at one time, which can improve the reliability of the grounding of the first radiation branch.

In a possible case, the first radiation branch 1110 and the metal ground 2000 may also be connected by welding, so as to implement the grounding of the first radiation branch 1110.

Optionally, the medium 5000 may be connected to the metal ground 2000.

Figure 5:
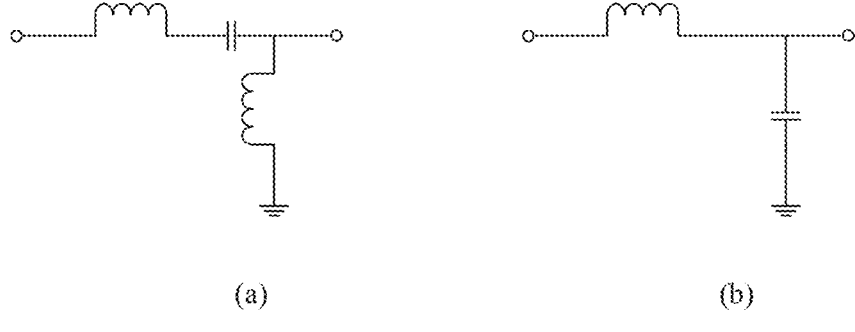
FIG. 5 is a schematic diagram of a first matching circuit or a second matching circuit according to an embodiment of this application.

Further, in a possible case, the first radiation branch 1110 and the first feed point 1120 may be connected by using the first matching circuit 1130 of the PCB 3000. The first matching circuit 1130 may include, as shown in FIG. 5(*a*), an inductor and a capacitor connected in series, and an inductor connected in parallel. The first matching circuit 1130 may further include, as shown in FIG. 5(*b*), an inductor connected in series and a capacitor connected in parallel. This is not limited in the embodiments of this application. The first matching circuit 1130 may be configured to perform impedance matching and/or operating frequency tuning on the first antenna 1100.

By performing impedance matching and/or operating frequency tuning on the first antenna by using the first matching circuit, the performance of the first antenna can be improved.

Similarly, the second radiation branch 1210 and the second feed point 1220 may also be connected by using the second matching circuit 1230 on the PCB 3000. The second matching circuit 1230 may be configured to perform impedance matching and/or operating frequency tuning on the second antenna 1200. The second matching circuit 1230 may be shown in FIG. 5(*a*), or may be shown in FIG. 5(*b*). This is not limited in this embodiment of this application.

By performing impedance matching and/or operating frequency tuning on the second antenna by using the second matching circuit, the performance of the second antenna can be improved.

In a case that the second antenna 1200 transmits a signal in the first frequency band, a first signal and a second signal are coupled from the second antenna 1200 to the first antenna 1100. In a case that the first signal and the second signal have a phase difference of (180±X)°, the first signal and the second signal may cancel each other, so as to implement a self-decoupling function of the first antenna 1100.

The working principles of how to obtain a first signal and a second signal having a phase difference of (180±X)° are described below.

Figure 6:
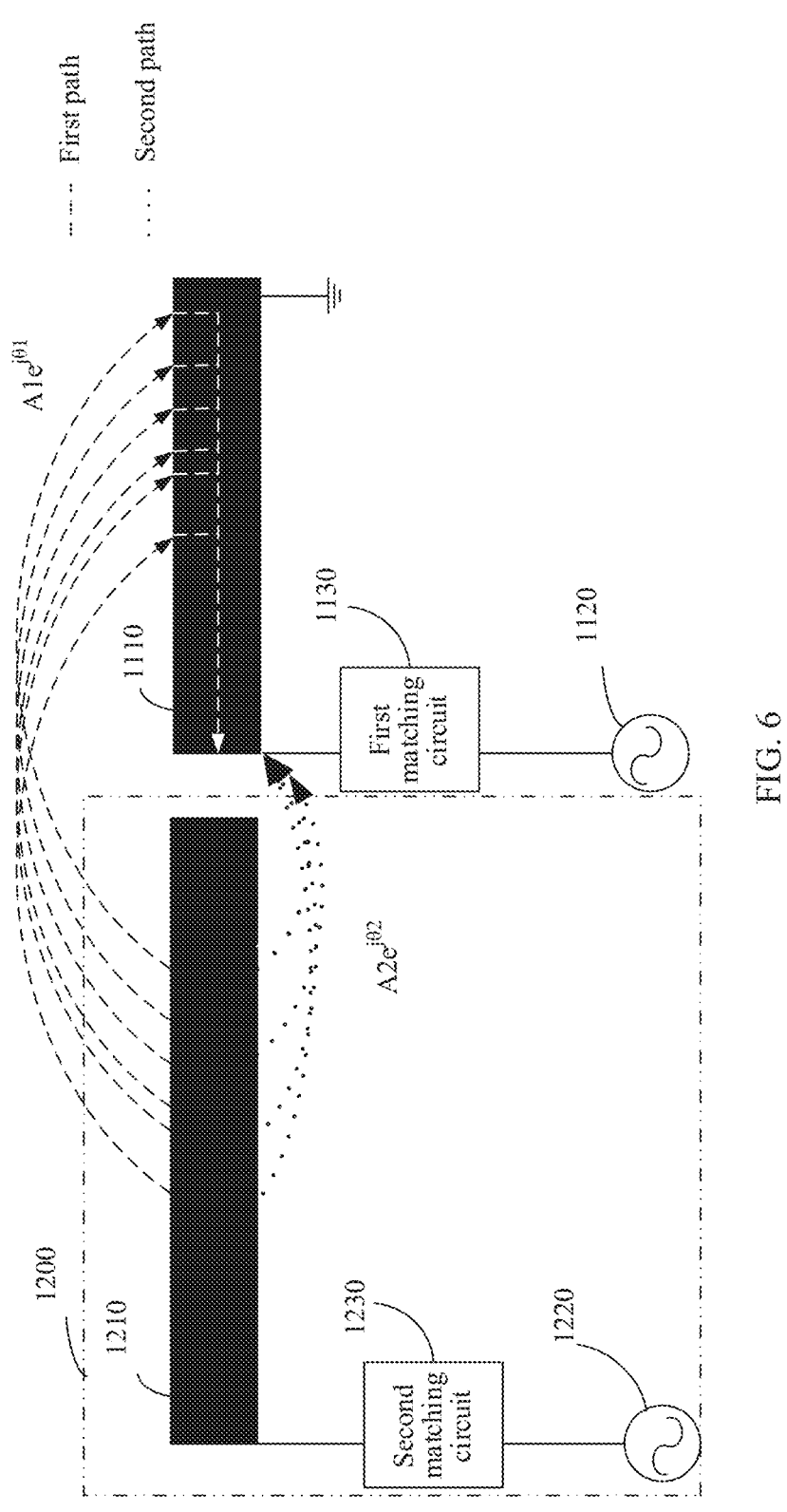
FIG. 6 is a schematic diagram of a first path and a second path according to an embodiment of this application.
Figure 7:
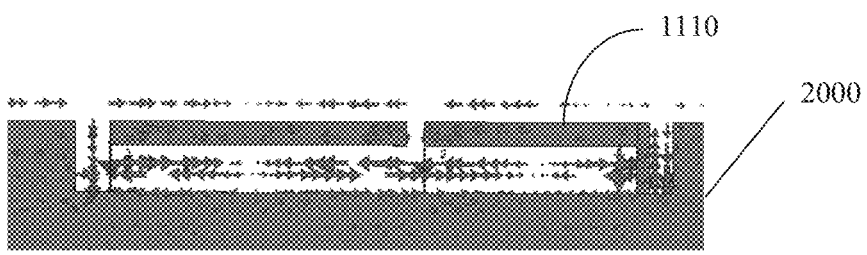
FIG. 7 is a simulation diagram of a surface current of a first antenna during receiving of a signal transmitted by a second antenna in an antenna combination system according to an embodiment of this application.

In a case that the second antenna 1200 transmits a signal, a coupling path graph of the first antenna 1100 and the second antenna 1200 is shown in FIG. 6. A signal radiated by the second antenna 1200, that is, the first signal, may be coupled by the first antenna 1100 by using the first radiation branch 1110 and a coupling path is a first path. A surface current graph during transmitting of a signal by the second antenna is shown in FIG. 7, where the first signal is coupled by the first antenna 1100 through the first path that passes through the first radiation branch 1110 to the first feed point 1120. The first signal may be represented by $A1e^{j\theta1}$, where A1 represents the amplitude of the first signal and θ1 represents the phase of the first signal. As shown in FIG. 7, the surface current of the first radiation branch 1110 is relatively strong, that is, the signal intensity of the coupled first signal is relatively large.

The second feed point 1220 is disposed on the side away from the first feed point 1120, and a distance between the first antenna 1100 and the second antenna 1200 is less than a first preset threshold. In this way, the second signal can be coupled by the first feed point 1120 directly from the second radiation branch 1210. Still referring to FIG. 6, the second signal is a signal coupled from the second radiation branch 1210 to the first antenna 1100 without passing through the second path to the first feed point through the first radiation branch 1110. The second signal may be represented by $A2e^{j\theta2}$, where A2 represents the amplitude of the second signal and θ2 represents the phase of the second signal.

As can be seen from FIG. 6, the first path is longer than the second path by the length of the first radiation branch 1110; and the first signal and the second signal therefore have a phase difference, which is correlated with the length of the first radiation branch 1110. In a case that the length of the first radiation branch is (½)λ, which is equivalent to that the first path is longer than the second path by (½)λ, that is, the phase difference between the first signal and the second signal is about 180°, and a signal amplitude of the first signal is the same as a signal amplitude of the second signal, the first signal and the second signal almost cancel each other.

By adjusting the length of the first radiation branch 1110, a phase difference between the first signal and the second signal may be (180±X)°, where X is less than a second preset threshold. That is, the phase difference between the first signal and the second signal is close to 180°. In a possible case, the phase difference between the first signal and the second signal is 180°.

Since the distance between the first antenna 1100 and the second antenna 1200 is less than the first preset threshold, the signal radiated by can be directly coupled by the second antenna 1200 through the second path, and by adjusting the distance between the first antenna 1100 and the second antenna 1200, for example, by setting the distance between the first antenna 1100 and the second antenna 1200 to D mm, an amplitude A2 of the second signal can be approximately the same as an amplitude A1 of the first signal.

In other words, the signal amplitude A1 of the first signal $A1e^{j\theta1}$ is approximately the same as the signal amplitude A2 of the second signal $A2e^{j\theta2}$, and in addition, a signal phase θ1 of the first signal $A1e^{e\theta1}$ and a signal phase θ2 of the second signal $A2e^{j\theta2}$ have a phase difference of (180±X)°. Therefore, $A1e^{j\theta1}+A2e^{j\theta2}≈0$, the first signal and the second signal in the first frequency band coupled by the first antenna 1100 can cancel each other, the total signal coupled by the first antenna 1100 is almost 0, so as to implement a self-decoupling function of the first antenna 1100 on a radiation signal, of the second antenna 1200, in the first frequency band. As can be seen from FIG. 7, although a coupling current of the first radiation branch 1110 is quite strong, only the first signal passes through the first radiation branch 1110, the total signal received by the first feed point 1120 is superposition of the first signal and the second signal, and the total signal after the superposition is quite weak.

Figure 11:
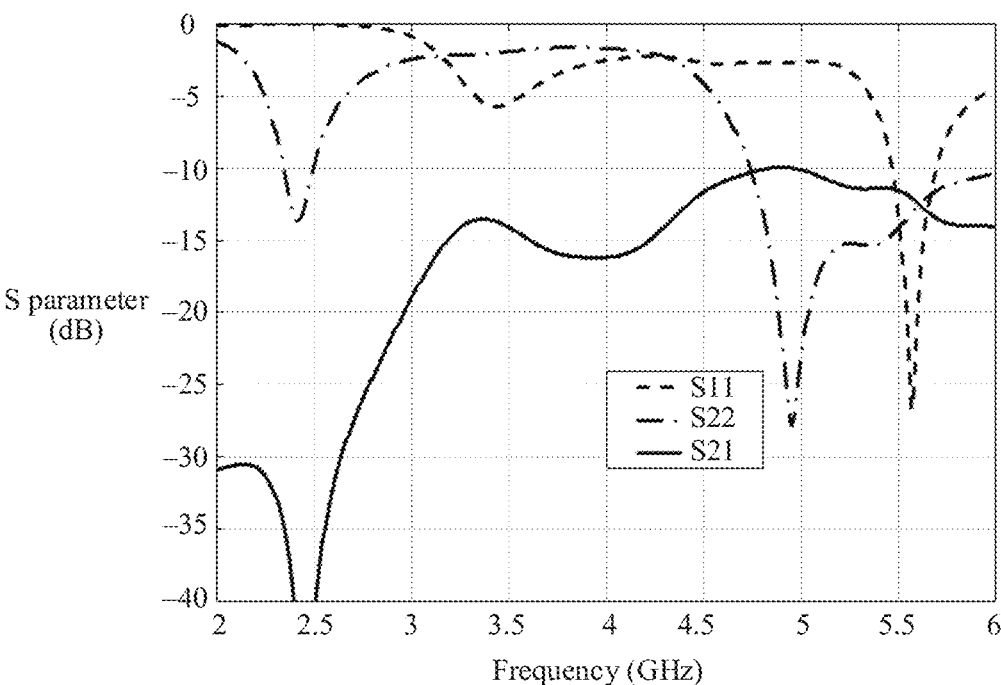
FIG. 11 is an S-parameter curve diagram of an antenna combination system according to an embodiment of this application.

In this embodiment of this application, after the first signal and the second signal cancel each other, an S parameter between the first antenna and the second antenna may be shown in FIG. 11. The center frequency of the first frequency band in which both the first antenna and the second antenna work is 5.4 GHz, where S21 of 5.4 GHz is less than −25 dB, which indicates that the degree of isolation of the first antenna and the second antenna at 5.4 GHz is quite high.

Similarly, in a case that the first antenna 1100 transmits a signal, a third signal and a fourth signal are coupled from the first antenna 1100 to the second antenna 1200, and a phase difference between the third signal and the fourth signal is (180±Y)°, where Y is less than a third preset threshold; the third signal is a signal coupled to the second antenna 1200 through a third path, where the third path is a path from the first feed point 1120 to the second antenna 1200 through the first radiation branch 1110, which is the same as the first path and has an opposite coupling direction; and the fourth signal is a signal coupled to the second antenna 1200 through fourth path, where the fourth path is a path from the first feed point 1120 to the second antenna 1200 without passing through the first radiation branch 1110, which is the same as the second path and has an opposite coupling direction. Similar to the foregoing working principles of obtaining the first signal and the second signal having the phase difference of (180±X)°, the third signal and the fourth signal may also cancel each other, and the total signal coupled to the second antenna 1200 is approximately 0, so as to implement a self-decoupling function of the second antenna 1200 on the radiation signal, of the first antenna 1100, in the first frequency band.

Figure 8:
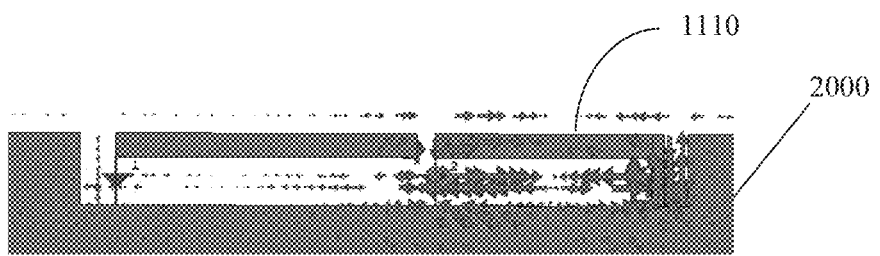
FIG. 8 is a simulation diagram of a surface current of a second antenna during receiving a signal transmitted by a first antenna in an antenna combination system according to an embodiment of this application.

In a case that the first antenna 1100 is in a transmit state, a surface current graph on the first radiation branch 1110 and the second radiation branch 1210 is shown in FIG. 8. It can be seen that, although the signals of the first antenna 1100 is coupled to the second antenna 1200 through the third path and the fourth path, both the signals of the two paths pass through the second radiation branch 1210, so that mutual cancellation after superimposition is implemented, and therefore the surface current on the second radiation branch 1210 is quite weak.

Figure 9:
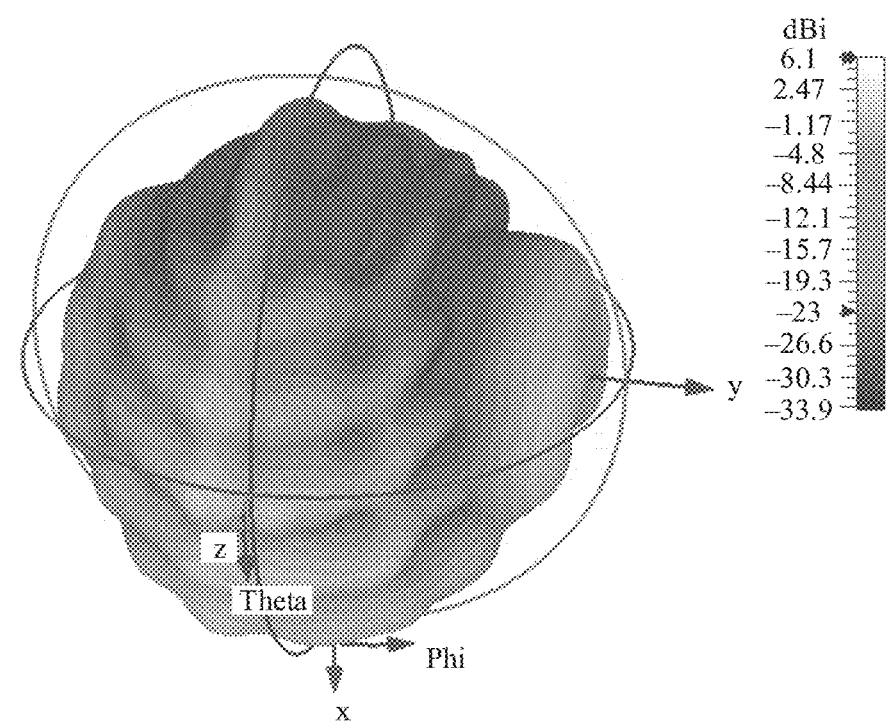
FIG. 9 is a schematic diagram of a simulation result of a directional graph of a first antenna according to an embodiment of this application.
Figure 10:
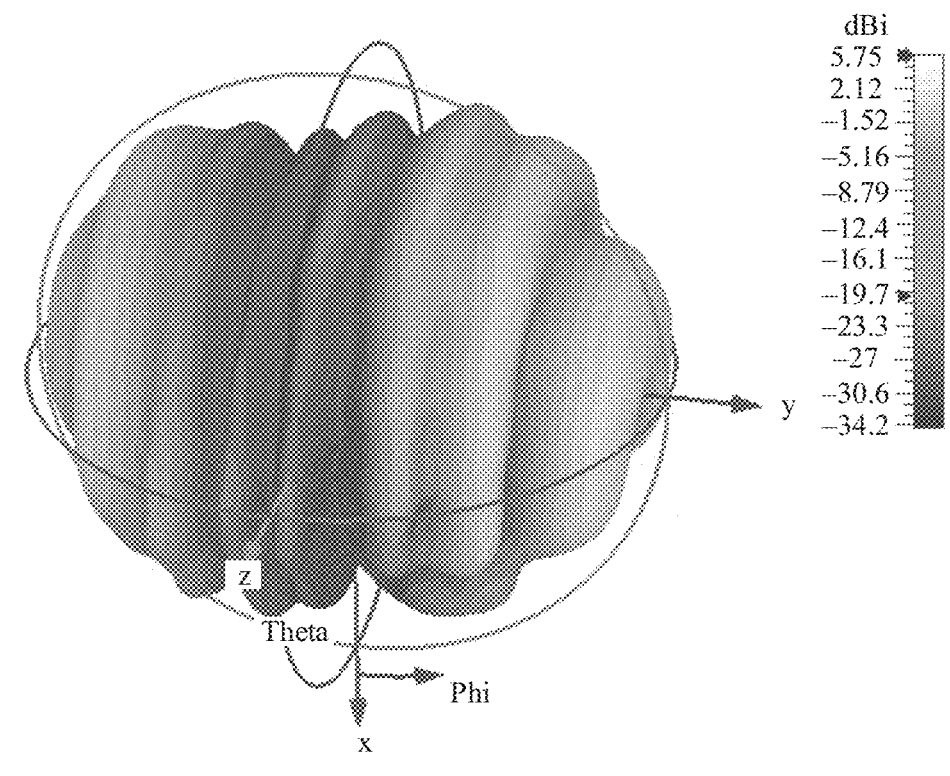
FIG. 10 is a schematic diagram of a simulation result of a directional graph of a second antenna according to an embodiment of this application.

In an example, a directional graph of the first antenna in the first frequency band may be shown in FIG. 9, and energy of the first antenna radiates downward. A directional graph of the second antenna in the first frequency band may be shown in FIG. 10, and energy of the second antenna radiates to two sides. In other words, the first antenna and the second antenna have different energy radiation directions, thereby implementing complementary directional patterns. In a use scenario of a Wi-Fi antenna, the network stability can be increased and the data throughput rate can be improved.

In an embodiment of this application, the antenna combination system includes a first antenna and a second antenna having a distance less than a first preset threshold. The first antenna includes a first radiation branch and a first feed point, a feed point of the second antenna is arranged on a side away from the first feed point, and a side of the first radiation branch away from the first feed point is grounded. The first feed point is arranged on a side close to the second antenna, and the length of the first radiation branch is an odd multiple of (½)λ an operating frequency band of the first antenna and an operating frequency band of the second antenna include a first frequency band. In a case that the second antenna transmits a signal, a first signal and a second signal having a phase difference of (180±X)° are coupled from the second antenna to the first antenna. Due to the phase difference of (180±X)° between the first signal and the second signal, the first signal and the second signal can cancel each other, which is equivalent to that a total signal obtained after superimposition of signals coupled from the second antenna to the first antenna is quite weak. In other words, in a case that the distance between the first antenna and the second antenna is relatively small, mutual interference between signals of the first antenna and the second antenna in the first frequency band can be reduced by using the antenna combination system, thereby increasing the degree of isolation between the first antenna and the second antenna. Further, in a case that the first antenna and the second antenna are Wi-Fi antennas, since the distance between the first antenna and the second antenna is less than the first preset threshold, by reasonably disposing the Wi-Fi chip, the distance between the second antenna and the Wi-Fi chip can become relatively close while the distance between the first antenna and the Wi-Fi chip is relatively close. Therefore, both the signal insertion loss between the first antenna and the Wi-Fi chip and the signal insertion loss between the second antenna and the Wi-Fi chip are relatively small.

Figure 12:
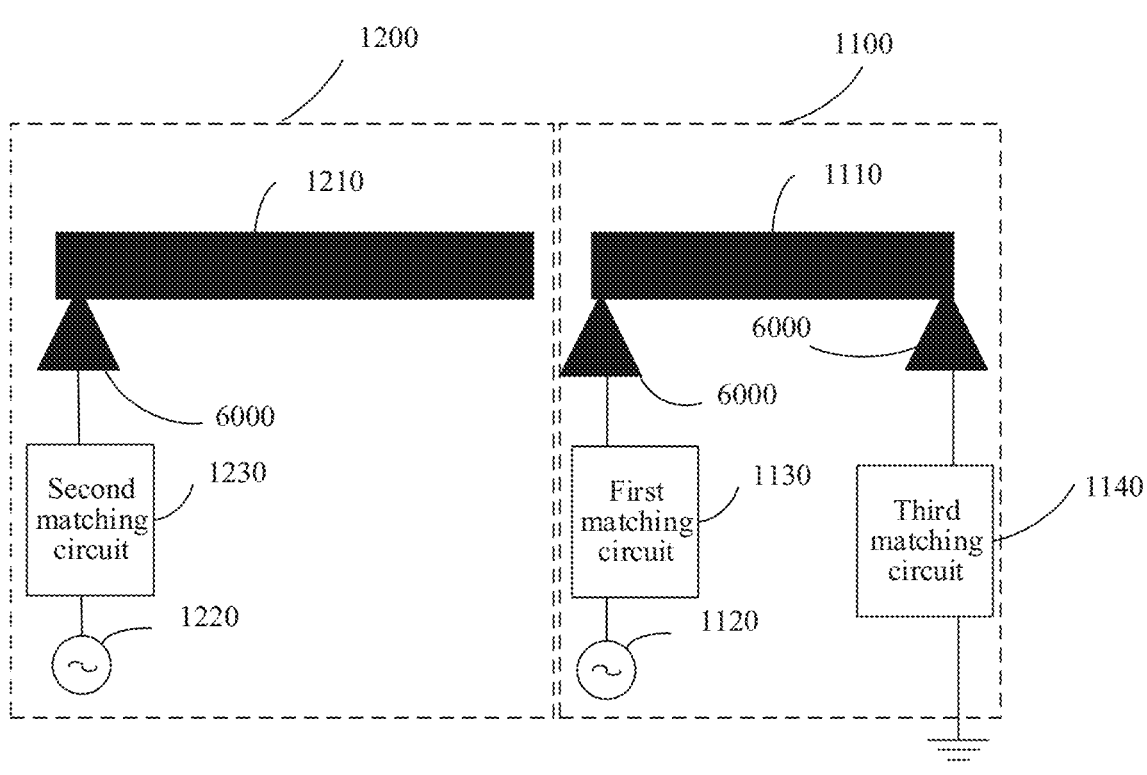
FIG. 12 is a schematic diagram of an antenna combination system according to another embodiment of this application.

In an example, an antenna combination system 1000 shown in FIG. 12 may include a first antenna 1100 and a second antenna 1200, a distance between the first antenna 1100 and the second antenna 1200 is less than a first preset threshold, the first antenna 1100 includes a first radiation branch 1110, a first feed point 1120, and a first matching circuit 1130, a side of the first radiation branch 1110 away from the first feed point 1120 is grounded, the first feed point 1120 is arranged on a side close to the second antenna 1200, a length of the first radiation branch 1110 is an odd multiple of ($\frac{1}{2}$)$\lambda$, and $\lambda$ is a wavelength in a medium corresponding to a first frequency band; and the second antenna includes a second radiation branch 1210, a second feed point 1220, and a second matching circuit 1230, where the second feed point 1220 is arranged on a side away from the first feed point 1120. An operating frequency band of the first antenna 1100 and an operating frequency band of the second antenna 1200 include a first frequency band, and the first antenna 1100 is coupled to the first signal and the second signal from the second antenna 1200; a side of the first radiation branch 1110 away from the first feed point 1120 is grounded through a third matching circuit 1140; and the third matching circuit 1140 is configured to adjust a phase of the first signal.

In a possible situation, due to the interference of the machining accuracy or spatially coupled signals, the phase difference between the first signal and the second signal is not $(180\pm X)°$ when the length of the first radiation branch 1110 is ($\frac{1}{2}$)$\lambda$. In this embodiment of this application, the phase difference between the first signal and the second signal in the first frequency band may be adjusted by using the third matching circuit 1140, so that the phase difference between the first signal and the second signal is $(180\pm X)°$.

The third matching circuit 1140 may be a capacitor or an inductor, may be a group of capacitors or a group of inductors, or may be a variable capacitor, which is not limited in this embodiment of this application. The characteristics of adding a capacitor or inductor on a Smith chart is the same as the characteristics of changing the length of the microstrip line (the first radiation branch 1110) on a Smith chart, and therefore the change of the length of the microstrip line can be replaced by adding a capacitor or inductor. The length of the first radiation branch 1110 affects the phase of the first signal, and therefore, the phase of the first signal can be adjusted by using the third matching circuit 1140, so that the phase difference between the first signal and the second signal is close to 180°; and in a case that the signal amplitude of the first signal is the same as the signal amplitude of the second signal and the phase difference between the first signal and the second signal is close to 180°, the first signal and the second signal can fully cancel each other.

In a possible situation, one side of the third matching circuit 1140 may be connected to the first radiation branch 1110 by using the spring sheet 6000, and the other side is grounded by using the PCB 3000.

In this embodiment of this application, by adjusting the phase of the first signal through the third matching circuit, the phase difference between the first signal and the second signal may become closer to 180°, which is equivalent to improving a mutual cancellation amplitude between the first signal and the second signal, further reducing mutual interference between signals of the first antenna and the second antenna in the first frequency band, and further increasing the degree of isolation between the first antenna and the second antenna.

In an example, the antenna combination system includes a first antenna 1100 and a second antenna 1200, a distance between the first antenna 1100 and the second antenna 1200 is less than $\frac{1}{4}\lambda$, the first antenna 1100 includes a first radiation branch 1110, a first feed point 1120, and a first matching circuit 1130, and a side of the first radiation branch 1110 away from the first feed point 1120 is grounded. The second antenna includes a second radiation branch 1210, a second feed point 1220, and a second matching circuit 1230, where the second feed point 1220 is arranged on a side away from the first feed point 1120. An operating frequency band of the first antenna 1100 and an operating frequency band of the second antenna 1200 include a first frequency band, in a case that the second antenna 1200 transmits a signal, a first signal and a second signal are coupled from the second antenna 1200 to the first antenna 1100, and in a case that the first antenna 1100 transmits a signal, the third signal and the fourth signal are coupled from the first antenna 1100 to the second antenna 1200.

It should be noted that in a case that the distance between the first antenna 1100 and the second antenna 1200 becomes smaller, the amplitude A2 of the second signal coupled to the first antenna 1100 through the second path becomes larger. Only when the amplitude A1 of the first signal coupled to the first antenna 1100 through the first path is approximately equal to the amplitude A2 of the second signal coupled to the first antenna through the second path, the effect of mutual cancellation of two signals is relatively good. For example, in a case that the distance between the first antenna 1100 and the second antenna 1200 is a value in $(0, \frac{1}{4}\lambda]$, the amplitude A1 of the first signal is equal to the amplitude A2 of the second signal, and the self-decoupling effect is optimal; and in a case that the distance increases or decreases, the degree of isolation gradually deteriorates.

In this embodiment of this application, in a case that the distance between the first antenna and the second antenna is a value in $(0, \frac{1}{4}\lambda]$, a signal amplitude A1 of the first signal is the same as a signal amplitude A2 of the second signal; and in a case that the phase difference between the first signal and the second signal is 180° and A1=A2, the first signal and the second signal may fully cancel each other, which can effectively reduce mutual interference between the first antenna and the second antenna, and improve the degree of isolation between the first antenna and the second antenna.

In this embodiment of this application, the second antenna may work in a plurality of frequency bands. For example, the second antenna may work in the first frequency band and a second frequency band other than the first frequency band. In a case that the second antenna works in the first frequency band and the second frequency band, the first antenna may further include a filter circuit configured to filter a signal in the second frequency band. The following describes in detail with reference to FIG. 13.

Figure 13:
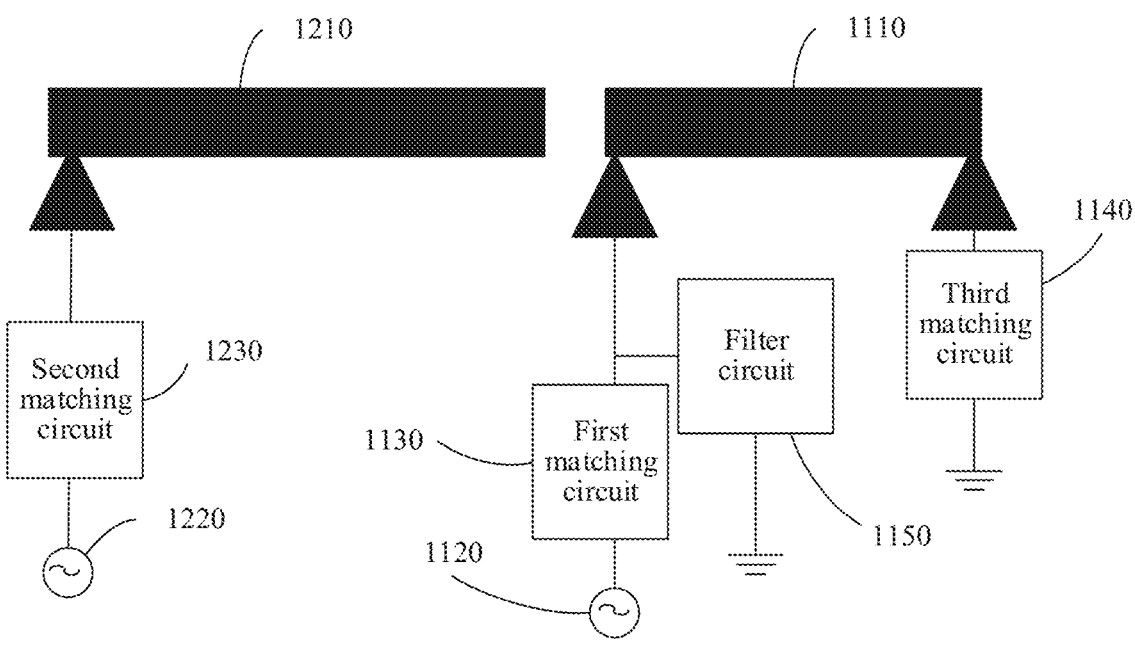
FIG. 13 is a schematic diagram of an antenna combination system according to another embodiment of this application.
Figure 14:
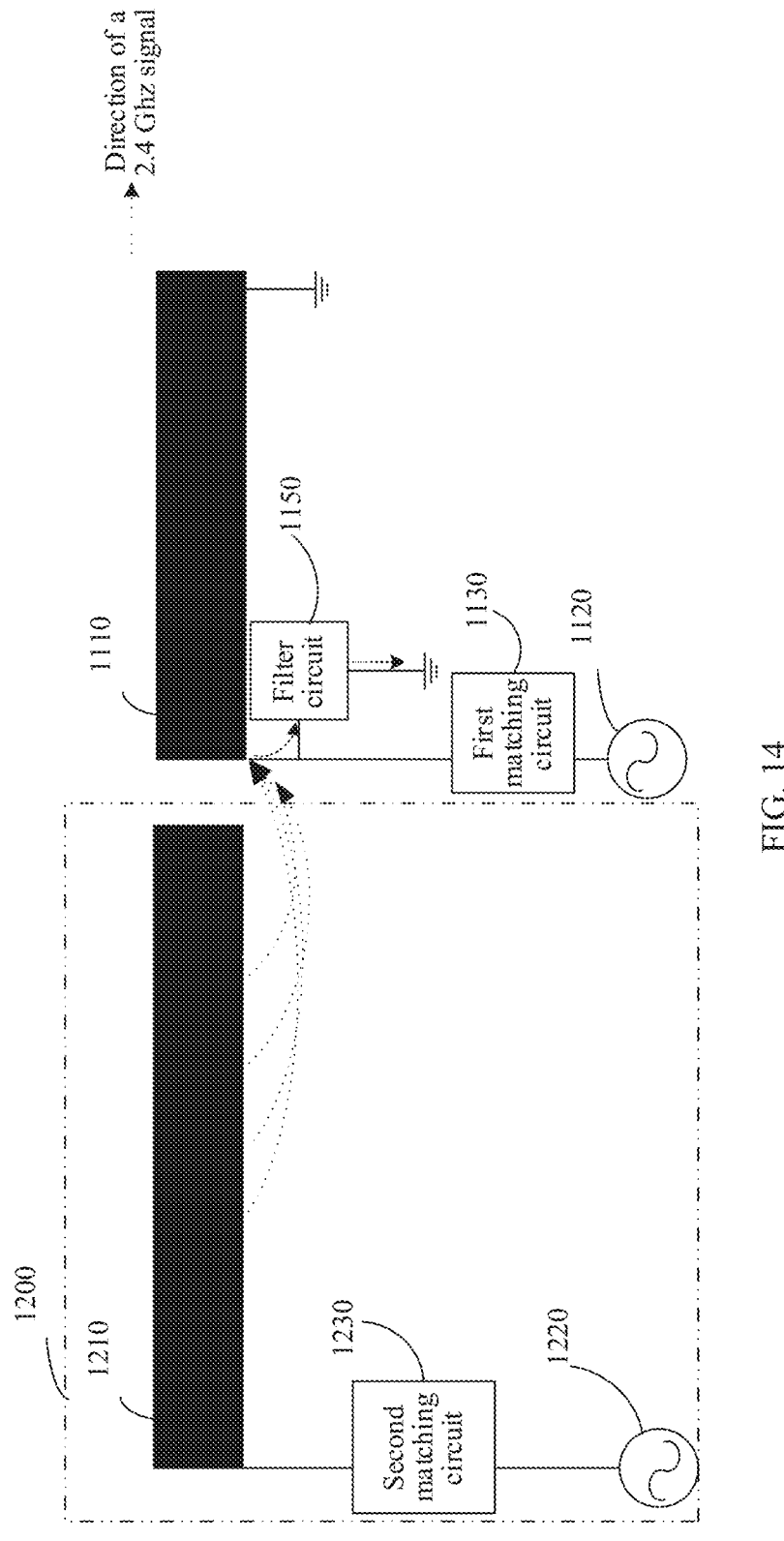
FIG. 14 is a schematic diagram of a path of a signal in a second frequency band according to an embodiment of this application.

FIG. 13 is a schematic structural diagram of an antenna combination system according to another embodiment of this application. As shown in FIG. 13, an antenna combination system 1000 includes a first antenna 1100 and a second antenna 1200, and a distance between the first antenna 1100 and the second antenna 1200 is less than a first preset threshold. The first antenna 1100 includes a first radiation branch 1110, a first feed point 1120, and a first matching circuit 1130, and a side of the first radiation branch 1110 away from the first feed point 1120 is grounded. The second antenna includes a second radiation branch 1210, a second feed point 1220, and a second matching circuit 1230, where the second feed point 1220 is arranged on a side away from the first feed point 1120. In a case that the second antenna 1200 transmits a signal, a first signal and a second signal are coupled from the second antenna 1200 to the first antenna 1100. The first antenna 1100 works in a first frequency band, the second antenna 1200 works in the first frequency band and a second frequency band, and the first antenna 1100 further includes a filter circuit 1150, where the filter circuit 1150 is configured to filter a signal in the second frequency band.

The filter circuit 1150 may be connected in parallel between the first radiation branch 1110 and the first matching circuit 1130. In a case that the second antenna 1200 works in the second frequency band (for example, 2.4 GHz), a signal of the second antenna 1200 is coupled to a coupled signal of the first antenna 1100, and a direction of the coupled signal may be shown in FIG. 14. The filter circuit 1150 may filter out a signal of the second antenna 1200 when working in the second frequency band.

Figure 15:
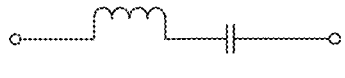
FIG. 15 is a schematic diagram of a filter circuit according to an embodiment of this application.

The filter circuit 1150 may be an LC filter circuit shown in FIG. 15, and the frequency of a signal filtered may be determined by using a formula $f=\frac{1}{2}\pi\sqrt{LC}$, where f represents a frequency of a signal filter circuit 1150, L represents an inductance value of an inductor, and C represents a capacitance value of a capacitor. By adjusting L and C, the filter circuit 1150 filters out the signal in the second frequency band.

In this embodiment of this application, in a case that the first antenna works in the first frequency band and the second antenna works in the first frequency band and the second frequency band, the signal coupled to the first antenna when the second antenna works in the second frequency band is filtered by using the filter circuit provided on the first antenna for filtering the signal in the second frequency band, thereby reducing the influence of the signal in the second frequency band on the coupling of the first antenna, further avoiding the interference of the second antenna on the first antenna, and increasing the degree of isolation between the first antenna and the second antenna.

For example, in an S-parameter curve diagram shown in FIG. 11, a center frequency of the first frequency band is 5.4 GHz, and a center frequency of the second frequency band is 2.45 GHz. S21 of the first antenna and the second antenna both working in the first frequency band of 5.4 GHz is below −25 dB, that is, the first antenna and the second antenna cancel each other by using the first signal and the second signal, so as to implement a self-decoupling function of the first antenna, so that the degree of isolation between the first antenna and the second antenna is quite high. The second antenna also works in the second frequency band, and S21 of the center frequency of 2.45 GHz of the second frequency band is below −30 dB, which indicates that the degree of isolation between the first antenna and the second antenna in the second frequency band is also quite high, and indicates that signals in the second frequency band can be effectively filtered by the filter circuit disposed on the first antenna.

Electromagnetic waves radiated by an antenna during working may affect human health, a closer distance between a human body and the antenna indicates a greater radiation energy received by the human body. In consideration of the human health, the antenna is typically connected to a specific absorption rate (Specific Absorption Rate, SAR) sensor, so as to reduce the impact of antenna radiation on the human health. The following describes in detail with reference to FIG. 16.

Figure 16:
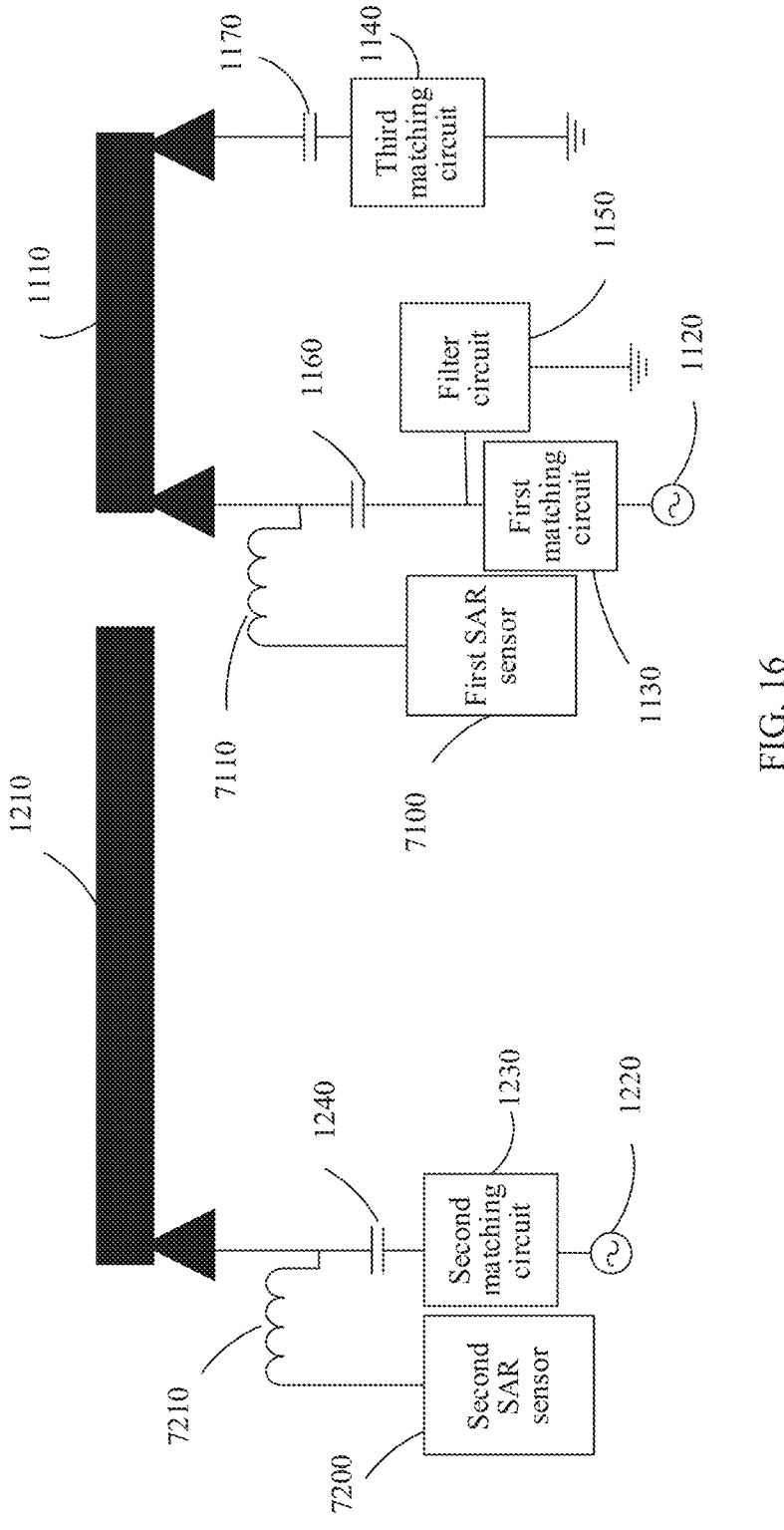
FIG. 16 is a schematic diagram of an antenna combination system according to another embodiment of this application.

FIG. 16 is a schematic structural diagram of an antenna combination system according to another embodiment of this application. As shown in FIG. 16, the first antenna 1100 is connected to a first SAR sensor 7100, where the first SAR sensor 7100 is configured to reduce transmit power of the first antenna 1100 upon detection of that a distance between a living body and the first radiation branch 1110 is less than a fourth preset threshold. The SAR sensor typically works in a direct-current state, and the antenna typically works in a high-frequency alternating-current state. Because the antenna does not work in the direct-current state, in a case that the living body approaches the first radiation branch 1110, a biological current carried on the living body is coupled to the first radiation branch 1110. In a possible case, the living body may be a human body.

The first SAR sensor 7100 detects a fluctuation of a capacitor to which the first radiation branch 1110 is equivalent, and determines, based on a detected equivalent capacitance, whether the living body approaches the first radiation branch 1110. Upon detection of that a living body approaches the first radiation branch 1110, the first SAR sensor 7100 reduces the transmit power of the first antenna 1100.

Specifically, the first SAR sensor 7100 is connected to a first side of the first radiation branch 1110 by a first inductor 7110, and the first side refers to a side of the first radiation branch 1110 connected to the first matching circuit 1130; the first matching circuit 1130 is connected to the first radiation branch 1110 by a first capacitor 1160, and a side of the first radiation branch 1110 away from the first feed point 1120 is grounded through a second capacitor 1170.

As can be seen from the above descriptions, the SAR sensor typically operates in a direct-current state, and the antenna typically operates in a high-frequency alternating-current state. The first SAR sensor 7100 is connected to the first side of the first radiation branch 1110 by the first inductor 7110, and an inductance value of the first inductor 7110 is relatively large, so that by using the characteristics of isolating an alternating current and transmitting a direct current, a signal is transmitted to the first SAR sensor 7100 only when the circuit is in the direct-current state, and a high-frequency alternating-current signal, of the antenna, in the operating frequency band is disconnected from the first SAR sensor 7100. Similarly, the first matching circuit 1130 is connected to the first radiation branch 1110 by the first capacitor 1160, and a capacitance value of the first capacitor 1160 is relatively large, so that by using the characteristics of isolating a direct current and transmitting an alternating current, the signal is transmitted to the first matching circuit 1130 only in the high-frequency alternating-current state, and the direct-current signal is isolated from the first matching circuit 1130. Similarly, a side of the first radiation branch 1110 away from the first matching circuit 1130 is grounded by the second capacitor 1170, and a capacitance value of the second capacitor 1170 is relatively large, so that by using the characteristics of isolating a direct current and transmitting an alternating current, a signal is grounded only in an operating frequency band of the antenna. In the direct-current state, a side of the first radiation branch 1110 away from the first matching circuit 1130 is isolated from the ground by the second capacitor 1170, which is equivalent to that the first SAR sensor is not grounded by the first radiation branch 1110 in the direct-current state.

In this embodiment of this application, by using the first SAR sensor connected to the first antenna, upon detection of that the distance between the living body and the first radiation branch is less than the fourth preset threshold, the transmit power of the first antenna is reduced, so that when a human body approaches the first radiation branch, the intensity of signals radiated by the first antenna is reduced, that is, the intensity of radiation signals received by the human body is reduced, thereby protecting the human body from damage caused by receiving excessive radiation signals.

As shown in FIG. 16, the second antenna may also be connected to the SAR sensor. The second antenna 1200 includes a second radiation branch 1210, the second antenna 1200 is connected to the second SAR sensor 7200, and the second SAR sensor 7200 is configured to reduce transmit power of the second antenna 1200 upon detection of that a distance between a living body and the second radiation branch 1210 is less than a fifth preset threshold.

Specifically, the second antenna 1200 further includes a second feed point 1220; the second SAR sensor 7200 is connected to the second side of a second radiation branch 1210 by a second inductor 7210, and the second side refers to a side of the second radiation branch 1210 connected to a second matching circuit 1230; and the second feed point 1220 is connected to the second radiation branch 1210 by a third capacitor 1240.

It should be noted that as shown in FIG. 11, in the direct-current state, the first SAR sensor 7100 is only connected to the first radiation branch 1110, is not grounded through the first radiation branch 1110, and is not connected to the first matching circuit 1130; and the second SAR sensor 7200 is only connected to the second radiation branch 1210, is not connected to ground through the second radiation branch 1210, and is not connected to the second matching circuit 1230. In the high-frequency alternating-current state, the antenna combination system shown in FIG. 16 is equivalent to the antenna combination system shown in FIG. 13.

The connection relationship between the second antenna and the second SAR sensor and the implementation principles are similar to the connection relationship between the first antenna and the first SAR sensor and the implementation principles, and details are not described herein again.

In a possible case, this application further provides a terminal device, where the terminal device includes the antenna combination system provided in the foregoing embodiments.

The type of terminal device is not specifically limited in this embodiment of this application. Exemplarily, the terminal device may be, but is not limited to, a mobile phone, a tablet computer, a smart speaker box, a smart large screen (also referred to as a smart TV), or a wearable device.

Figure 17:
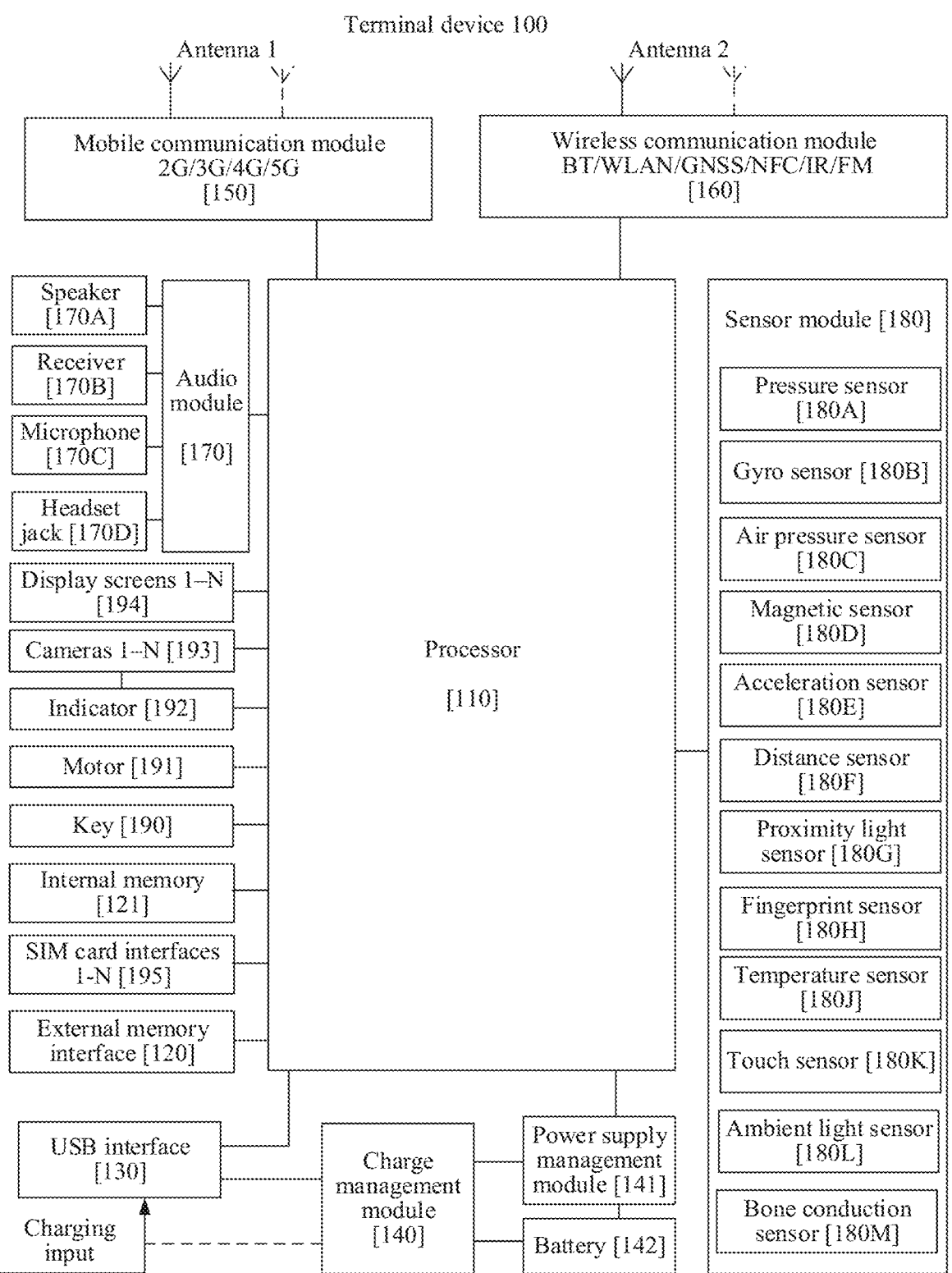
FIG. 17 is a schematic structural diagram of a terminal device according to an embodiment of this application.

Exemplarily, FIG. 17 is a schematic structural diagram of a terminal device 100. The terminal device 100 may include a processor 110, an external memory interface 120, an internal memory 121, a universal serial bus (universal serial bus, USB) interface 130, a charging management module 140, a power supply management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the terminal device 100. In some other embodiments of this application, the terminal device 100 may include more or fewer components than those shown in the figure, or combine some components, or split some components, or have different component arrangements. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a base-band processor, and/or a neural-network processing unit (neural-network processing unit, NPU), and the like. Different processing units may be separate devices, or may be integrated into one or more processors.

The controller may be a nerve center and a command center of the terminal device 100. The controller may generate an operation control signal based on instruction operation code and a time-sequence signal, and control obtaining and executing of instructions.

A memory may also be disposed in the processor 110, configured to store instructions and data. In some embodiments, the memory in processor 110 is a cache memory. The memory may store instructions or data recently used or cyclically used by the processor 110. In a case that the processor 110 needs to use the instructions or the data again, the processor may directly call the instructions or the data from the memory. Repeated access is avoided, and waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (serial clock line, SCL). In some embodiments, the processor 110 may include a plurality of I2C buses. The processor 110 may be coupled to the touch sensor 180K, a charger, a flash light, the camera 193, and the like by using different I2C bus interfaces respectively. For example, the processor 110 may be coupled to the touch sensor 180K through an I2C interface, so that the processor 110 and the touch sensor 180K communicate through an I2C bus interface, to implement a touch function of the terminal device 100.

The I2S interface may be configured to perform audio communication. In some embodiments, the processor 110 may include a plurality of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to perform a function of answering a call through a Bluetooth headset.

The PCM interface may also be configured to perform audio communication, to sample, quantize, and encode an analog signal. In some embodiments, the audio module 170 may be coupled to the wireless communication module 160 through a PCM bus interface. In some embodiments, the audio module 170 may also transfer an audio signal to the wireless communication module 160 through the PCM interface, to perform the function of answering a call through the Bluetooth headset. Both the I2S interface and the PCM interface may be configured to perform audio communication.

The UART interface is a universal serial data bus and is configured to perform asynchronous communication. The bus may be a bidirectional communications bus. The bus converts data to be transmitted between serial communication and parallel communication. In some embodiments, the UART interface is typically configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 through the UART interface, to perform a function of playing music through the Bluetooth headset.

The MIPI may be configured to connect the processor 110 to a peripheral component such as the display screen 194 or the camera 193. The MIPI includes a camera serial interface (camera serial interface, CSI), a display serial interface (display serial interface, DSI), and the like. In some embodiments, the processor 110 communicates with the camera 193 by using the CSI interface, to implement a photographing function of the terminal device 100. The processor 110 communicates with the display screen 194 by using the DSI interface, to implement a display function of the terminal device 100.

A GPIO interface may be configured by software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, a MIPI, and the like.

The USB interface 130 is an interface that complies with the USB standard specification, and may be specifically a Mini USB interface, a Micro USB interface, a USB Type C interface, and the like. The USB interface 130 may be configured to connect to the charger to charge the terminal device 100, or may be used for data transmission between the terminal device 100 and a peripheral device, or may also be configured to connect to a headset to play audio through the headset. The interface may alternatively be configured to connect to another terminal device, for example, an AR device.

It may be understood that an interface connection relationship between the modules illustrated in this embodiment of this application is merely an example for description, and does not constitute a limitation on a structure of the terminal device 100. In some other embodiments of this application, the terminal device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input by using a wireless charging coil of the terminal device 100. While charging the battery 142, the charging management module 140 may further supply power to the terminal device 100 by using the power supply management module 141.

The power supply management module 141 is configured to be connected to the battery 142, the charging management module 140, and the processor 110. The power supply management module 141 receives input from the battery 142 and/or the charging management module 140, and supplies power to the processor 110, the internal memory 121, the external memory, the display screen 194, the camera 193, the wireless communication module 160, and the like. The power supply management module 141 may also be configured to monitor parameters such as battery capacity, a battery cycle count, a battery state of health (electric leakage and impedance). In some other embodiments, the power supply management module 141 may alternatively be disposed in the processor 110. In some other embodiments, the power supply management module 141 and the charging management module 140 may also be disposed in a same device.

A wireless communication function of the terminal device 100 may be implemented by using the antenna 1, the antenna 2, the mobile communication module 150, the wireless communication module 160, the modem processor, the base-band processor, and the like.

The antenna 1 and the antenna 2 are configured to transmit and receive an electromagnetic wave signal. Each antenna in the terminal device 100 may be configured to cover a single communication frequency band or a plurality of communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 150 can provide a solution for wireless communication including 2G/3G/4G/5G and the like to be applied to the terminal device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some of the functional modules of the mobile communication module 150 may be disposed in a same device as at least some of modules of the processor 110.

The modem processor may include a modulator and a demodulator. The modulator is configured to modulate a low frequency base-band signal to be sent into a medium and high frequency signal. The demodulator is configured to demodulate the received electromagnetic wave signal into a low-frequency base-band signal. Then the demodulator transfers the low-frequency base-band signal obtained through demodulation to the base-band processor for processing. The low-frequency base-band signal is processed by the base-band processor and then transferred to an application processor. The application processor outputs a sound signal through an audio device (which is not limited to the loudspeaker 170A, the telephone receiver 170B, and the like), or displays an image or a video through the display screen 194. In some embodiments, the modem processor may be an independent device. In some other embodiments, the modem processor may be independent of the processor 110, and is disposed in a same device as the mobile communication module 150 or another function module.

The wireless communication module 160 may provide a solution to wireless communication applied to the terminal device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components into which at least one communication processing module is integrated. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, in the terminal device 100, the antenna 1 is coupled to the mobile communication module 150, and the antenna 2 is coupled to the wireless communication module 160, so that the terminal device 100 can communicate with a network and another device by using a wireless communications technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access.

WCDMA), time-division code division multiple access (time-division code division multiple access, TD-SCDMA), long term evolution (long term evolution. LTE), a 5th Generation of wireless communication system (5G, the 5th Generation of wireless communication system), BT, a GNSS, a WLAN, NFC, FM, and/or the like. The GNSS may include a global positioning system (global positioning system. GPS), a global navigation satellite system (global navigation satellite system. GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The terminal device 100 implements a display function by using the GPU, the display screen 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute a program instruction to generate or change display information.

The display 194 is configured to display an image, a video, and the like. The display 194 includes a display panel. The display panel may use a liquid crystal touchscreen (liquid crystal display. LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a Miniled, a MicroLed, a Micro-oLed, a quantum dot light-emitting diode (quantum dot light-emitting diodes, QLED), and the like. In some embodiments, the terminal device 100 may include 1 or N displays 194. N is a positive integer greater than 1.

The terminal device 100 can implement a photographing function by using the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may also optimize noise point, brightness, and skin tone algorithms. The ISP may also optimize parameters such as exposure and color temperature of a photographed scene. In some embodiments, the ISP may be arranged in the camera 193.

The camera 193 is configured to capture a still image or video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard RGB and YUV formats. In some embodiments, the terminal device 100 may include one or N cameras 193, where N is a positive integer greater than 1.

The digital signal processor is configured to process a digital signal, and in addition to a digital image signal, the digital signal processor may further process another digital signal. For example, in a case that the terminal device 100 performs frequency channel selection, the digital signal processor is configured to perform Fourier transformation and the like on frequency channel energy.

The video codec is configured to compress or decompress a digital video. The terminal device 100 can support one or more video codecs. In this way, the terminal device 100 may play or record videos in a plurality of encoding formats, for example, moving picture experts group (moving picture experts group, MPEG) 1, MPEG 2, MPEG 3, and MPEG 4.

An NPU is a neural network (neural-network, NN) computing processor. By using the structure of a biological neural network, for example, a transmission mode between neurons of a human brain, the NPU can process input information quickly and learn by itself continuously. The NPU may be used to implement an application such as intelligent cognition of the terminal device 100, for example, image recognition, facial recognition, voice recognition, and text understanding.

The external memory interface 120 may be configured to connect to an external storage card such as a micro SD card, to extend a storage capability of the terminal device 100. The external storage card communicates with the processor 110 by using the external memory interface 120, to implement a data storage function, for example, store files such as music and a video into the external storage card.

The internal memory 121 may be configured to store computer-executable program code. The executable program code includes an instruction. The processor 110 runs the instructions stored in the internal memory 121, to implement various functional applications and data processing of the terminal device 100. The internal memory 121 may include a program storage area and a data storage area. The program storage area may store an operating system, an application required by at least one function (such as a sound playback function and an image playback function), and the like. The data storage area may store data (for example, audio data, a phone book, or the like) created during use of the terminal device 100. In addition, the internal memory 121 may include a high-speed random access memory, and may also include a non-volatile memory, for example, at least one magnetic disk storage device, a flash memory device, or a universal flash storage (universal flash storage, UFS).

The terminal device 100 can implement an audio function, for example, music playback and recording, by using the audio module 170, the speaker 170A, the phone receiver 170B, the microphone 170C, the headset jack 170D, the application processor, and the like, for example, music playing or recording.

The audio module 170 is configured to convert digital audio information into analog audio signal output, and is also configured to convert analog audio input into a digital audio signal. The audio module 170 may further be configured to encode and decode audio signals. In some embodiments, the audio module 170 may be disposed in the processor 110, or some function modules in the audio module 170 are disposed in the processor 110.

The speaker 170A, also referred to as "horn", is configured to convert an electrical audio signal into a sound signal. Music can be listened to or a hands-free call can be answered by using the speaker 170A in the terminal device 100.

The telephone receiver 170B, also referred to as "handset", is configured to convert an electrical audio signal into a sound signal. In a case that a call is answered or audio information is listened to by using the terminal device 100, the phone receiver 170B may be put close to a human ear to listen to a voice.

The microphone 170C, also referred to as "voice tube" or "mike", is configured to convert a sound signal into an electrical signal. In a case that making a call or sending voice information, a user may make a sound approaching the microphone 170C through the mouth of the user, to input a sound signal into the microphone 170C. At least one microphone 170C may be disposed in the terminal device 100. In some other embodiments, two microphones 170C may be disposed in the terminal device 100, to collect a sound signal and further implement a noise reduction function. In some other embodiments, alternatively, three, four, or more microphones 170C may be disposed in the terminal device 100, to collect a sound signal, reduce noise, and further identify a sound source, implement a directional recording function, and the like.

The headset jack 170D is configured to be connected to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may be a parallel plate including at least two conductive materials. In a case that a force is applied onto the pressure sensor 180A, a capacitance between electrodes changes. The terminal device 100 determines intensity of the pressure based on the change in the capacitance. In a case that a touch operation acts on the display 194, the terminal device 100 measures the intensity of the touch operation by using the pressure sensor 180A. The terminal device 100 may also calculate a touch position based on a detection signal of the pressure sensor 180A. In some embodiments, touch operations that are applied to a same touch position but have different touch operation intensity may correspond to different operation instructions. For example, in a case that a touch operation whose touch operation strength is less than a first pressure threshold is performed on an SMS message application icon, an instruction of checking an SMS message is executed. In a case that a touch operation whose touch operation strength is greater than or equal to the first pressure threshold is performed on the short message application icon, an instruction of creating a new short message is executed.

The gyro sensor 180B may be configured to determine a moving posture of the terminal device 100. In some embodiments, angular velocities of the terminal device 100 around three axes (that is, x, y, and z axes) may be determined by the gyro sensor 180B. The gyro sensor 180B may be used for image stabilization during photographing. Exemplarily, in a case that the shutter is pressed, the gyro sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyro sensor 180B may also be used in navigation and a motion sensing game scenario.

The air pressure sensor 180C is configured to measure an air pressure. In some embodiments, the terminal device 100 calculates an altitude by using a barometric pressure value measured by the barometric pressure sensor 180C, to assist in positioning and navigation.

A magnetic sensor 180D includes a Hall sensor. The terminal device 100 may detect opening and closing of a flip leather case by using the magnetic sensor 180D. In some embodiments, in a case that the terminal device 100 is a clamshell phone, the terminal device 100 may detect opening and closing of a flip cover based on the magnetic sensor 180D. Further, features such as automatic unlocking of the flip cover are set based on the detected opening and closing states of the leather case or opening and closing states of the flip cover.

The acceleration sensor 180E may measure magnitudes of accelerations of the terminal device 100 in various directions (generally three axes); may detect magnitude and a direction of the gravity in a case that the terminal device 100 is static, or may be further configured to recognize a posture of the terminal device, and is applied to switching between a landscape screen mode and a portrait screen mode or an application such as a pedometer.

The distance sensor 180F is configured to measure a distance. The terminal device 100 may measure the distance by using infrared or laser. In some embodiments, in a photographing scene, the terminal device 100 may use the distance sensor 180F to measure a distance to implement fast focusing.

The proximity light sensor 180G may include, for example, a light-emitting diode (LED) and a light detector, for example, a photodiode. The light-emitting diode may be an infrared light-emitting diode. The terminal device 100 emits infrared light by using the light-emitting diode. The terminal device 100 uses a photodiode to detect infrared reflected light from an object nearby. In a case that sufficient reflected light is detected, it may be determined that there is an object near the terminal device 100. In a case that insufficient reflected light is detected, the terminal device 100 may determine that there is no object near the terminal device 100. The terminal device 100 may detect, by using the proximity light sensor 180G, that the user holds the terminal device 100 close to an ear to make a call, to automatically turn off the screen for power saving. The proximity light sensor 180G may be further configured to automatically unlock and lock the screen in a leather cover mode and a pocket mode.

The ambient light sensor 180L is configured to perceive ambient light brightness. The terminal device 100 may adaptively adjust brightness of the display screen 194 based on the sensed ambient light brightness. The ambient light sensor 180L may also be configured to automatically adjust white balance during photographing. The ambient light sensor 180L may also cooperate with the proximity light sensor 180G to detect whether the terminal device 100 is in a pocket to prevent a false touch.

The fingerprint sensor 180H is configured to acquire a fingerprint. The terminal device 100 may use a feature of the collected fingerprint to implement fingerprint-based unlocking, accessing an application lock, fingerprint-based photographing, fingerprint-based call answering, and the like.

The temperature sensor 180J is configured to detect temperature. In some embodiments, the terminal device 100 executes a temperature processing policy by using the temperature detected by the temperature sensor 180J. For example, in a case that the temperature reported by the temperature sensor 180J exceeds a threshold, the terminal device 100 lowers performance of a processor located near the temperature sensor 180J, to reduce power consumption to implement thermal protection. In some other embodiments, in a case that the temperature is below another threshold, the terminal device 100 heats the battery 142 to prevent the low temperature from causing the terminal device 100 to shut down abnormally. In some other embodiments, in a case that the temperature is below still another threshold, the terminal device 100 boosts an output voltage of the battery 142 to prevent abnormal shutdown caused by the low temperature.

The touch sensor 180K is also referred to as a "touch panel". The touch sensor 180K may be disposed on the display screen 194. The touch sensor 180K and the display screen 194 form a touchscreen, also referred to as a "touch screen" The touch sensor 180K is configured to detect a touch operation on or near the touch sensor 180K. The touch sensor may transfer the detected touch operation to the application processor to determine a type of the touch event. The touch sensor 180K may provide a visual output related to the touch operation by using the display screen 194. In some other embodiments, the touch sensor 180K may also be disposed on a surface of the terminal device 100 at a position different from that of the display screen 194.

The bone conduction sensor 180M may collect a vibration signal. In some embodiments, the bone conduction sensor 180M may obtain a vibration signal of an acoustic portion vibrating bone of a human body. The bone conduction sensor 180M may also come into contact with a human pulse to receive a blood pressure pulse signal. In some embodiments, the bone conduction sensor 180M may also be disposed in the headset, to combine into a bone conduction headset. The audio module 170 may obtain a speech signal through parsing based on the vibration signal, of the vibration bone of the vocal-cord part, that is obtained by the bone conduction sensor 180M, to implement a speech function. The application processor may parse heart rate information based on the blood pressure beating signal obtained by the bone conduction sensor 180M, to implement a heart rate measurement function.

The button 190 includes a power button, a volume button, and the like. The button 190 may be a mechanical button, or a touch-type button. The terminal device 100 may receive key input, generate key signal input related to a user setting and function control of the terminal device 100.

The motor 191 may generate a vibration prompt. The motor 191 may be used for an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations applied to different areas of the display screen 194. Different application scenarios (for example, a time reminder, information receiving, an alarm clock, and a game) may further correspond to different vibration feedback effects. Customization of a touch vibration feedback effect may also be supported.

The indicator 192 may be an indicator light that may be configured to indicate a charging state and a power change, or may be configured to indicate a message, a missed call, a notification, and the like.

The SIM card interface 195 is configured to connect a SIM card. The SIM card may be inserted into the SIM card interface 195 or plugged from the SIM card interface 195 to come into contact with or be separated from the terminal device 100. The terminal device 100 may support 1 or N SIM card interfaces. N is a positive integer greater than 1. The SIM card interface 195 can support a nano SIM card, a micro SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may also be compatible with an external memory card. The terminal device 100 interacts with a network by using the SIM card, to implement a call function, a data communication function, and the like. In some embodiments, the terminal device 100 uses an eSIM, that is, an embedded SIM card. The eSIM card may be embedded in the terminal device 100, and cannot be separated from the terminal device 100.

It should be noted that any terminal device mentioned in the embodiments of this application may include more or less modules in the terminal device 100.

A software system of the terminal device 100 may use a layered architecture, an event driven architecture, a micro core architecture, a micro service architecture, or a cloud architecture. In this embodiment of this application, an Android system of a layered architecture is used as an example to illustrate a software structure of the terminal device 100.

The terminal device provided in this embodiment of this application may include a memory, a processor, and a computer program stored in the memory and executable on the processor. The processor, when executing the computer program, implements the method according to any of the foregoing method embodiments.

In a possible situation, the terminal device further includes a Wi-Fi chip connected to the foregoing antenna combination.

Because the antenna combination system includes a first antenna and a second antenna having a distance less than the first preset threshold, the first antenna and the second antenna may be simultaneously disposed in an area close to the Wi-Fi chip, so that in a case that the insertion loss from the first antenna to the Wi-Fi chip is less than a preset insertion loss threshold, the insertion loss from the second antenna to the Wi-Fi chip can be simultaneously less than the preset insertion loss threshold.

In the foregoing embodiments of this application, the descriptions of the embodiments have respective focuses. For a part that is not described in detail in an embodiment, reference may be made to descriptions in other embodiments. It is to be understood that sequence numbers of the foregoing processes do not indicate an execution sequence, and an execution sequence of processes shall be determined based on functions and internal logic thereof, and shall constitute no limitation on an implementation process of the embodiments of this application. In addition, in the descriptions of the specification and claims of this application, the terms "first", "second" and "third" are only used for distinguishing description, and cannot be understood as indicating or implying relative importance. Reference to "one embodiment" or "some embodiments" described in this specification means that a specific characteristic, structure, or feature described in combination with this embodiment is included in one or more embodiments of this application. Therefore, the statements "in one embodiment", "in some embodiments", "in some other embodiments", "in other embodiments", and the like in the differences in this specification do not necessarily refer to the same embodiment, but mean "one or more but not all embodiments", unless otherwise specially emphasized in other ways.

Finally, it should be noted that: the foregoing descriptions are merely specific embodiments of this application, but are not intended to limit the protection scope of this application. Any variation or replacement within the technical scope disclosed in this application shall fall within the protection scope of this application. Therefore, the protection scope of this application shall be used as protection scope of the claims.

What is claimed is:

1. An antenna combination system, comprising:
a first antenna comprising a first radiation branch and a first feed point; and
a second antenna,
wherein a distance between the first antenna and the second antenna is less than a first preset threshold,
wherein the first feed point is arranged on a side of the first antenna close to the second antenna,
wherein a feed point of the second antenna is arranged on a side of the second antenna away from the first feed point,
wherein the first radiation branch is grounded on the side of the first antenna away from the first feed point,
wherein an operating frequency band of the first antenna and an operating frequency band of the second antenna each comprise a first frequency band, and $\lambda$ is a wavelength in a medium corresponding to the first frequency band, and
wherein a length of the first radiation branch is an odd multiple of $(\frac{1}{2})\lambda$.

2. The antenna combination system of claim 1, wherein in a case that the second antenna transmits a signal in the first frequency band, a first signal and a second signal that are different are coupled from the second antenna to the first antenna, and a phase difference between the first signal and the second signal is $(180\pm X)°$, wherein X is less than a second preset threshold, and wherein the first signal is a signal coupled to the first antenna through a first path, the second signal is a signal coupled to the first antenna through a second path, the first path is a path to the first feed point through the first radiation branch, and the second path is a path to the first feed point through the first radiation branch.

3. The antenna combination system of claim 1, wherein in a case that the first antenna transmits a signal in the first frequency band, a third signal and a fourth signal are coupled from the first antenna to the second antenna, and a phase difference between the third signal and the fourth signal is $(180\pm Y)°$, wherein Y is less than a third preset threshold, wherein the third signal is a signal coupled to the second antenna through a third path, wherein the third path is a path from the first feed point to the second antenna through the first radiation branch, wherein the fourth signal is a signal coupled to the second antenna through a fourth path, and wherein the fourth path is a path from the first feed point to the second antenna without passing through the first radiation branch.

4. The antenna combination system of claim 1, wherein the first antenna further comprises a first matching circuit that is configured to perform impedance matching and/or operating frequency tuning on the first antenna, and wherein the second antenna further comprises a second matching circuit that is configured to perform impedance matching and/or operating frequency tuning on the second antenna.

5. The antenna combination system of claim 2, wherein a side of the first radiation branch away from the first feed point is grounded by a third matching circuit that is configured to adjust a phase of the first signal.

6. The antenna combination system of claim 1, wherein the first preset threshold is ¼λ.

7. The antenna combination system of claim 1, wherein the operating frequency band of the second antenna further comprises a second frequency band, and wherein the first antenna comprises a filter circuit that is configured to filter a signal in the second frequency band.

8. The antenna combination system of claim 1, wherein the first radiation branch is connected to a metal ground by an integral forming method.

9. The antenna combination system of claim 1, wherein the first antenna is connected to a first specific absorption rate (SAR) sensor that is configured to reduce a transmit power of the first antenna upon detection of that based on a distance between a living body and the first radiation branch being less than a fourth preset threshold.

10. The antenna combination system of claim 9, wherein the first SAR sensor is connected to a first side of the first radiation branch by a first inductor, and the first side is a side of the first radiation branch connected to the first feed point, wherein the first feed point is connected to the first radiation branch by a first capacitor, and wherein the side of the first radiation branch away from the first feed point is grounded by a second capacitor.

11. The antenna combination system of claim 1, wherein the second antenna comprises a second radiation branch, and wherein the second antenna is connected to a second specific absorption rate (SAR) sensor that is configured to reduce transmit power of the second antenna based on a distance between a living body and the second radiation branch being less than a fifth preset threshold.

12. The antenna combination system of claim 11, wherein the second SAR sensor is connected to a second side of the second radiation branch by a second inductor, wherein the second side is a side of the second radiation branch connected to the feed point of the second antenna, and wherein the feed point of the second antenna is connected to the second radiation branch through a third capacitor.

13. A terminal device, comprising:
an antenna combination system, comprising:
    a first antenna comprising a first radiation branch and a first feed point; and
    a second antenna,
wherein a distance between the first antenna and the second antenna is less than a first preset threshold,
wherein the first feed point is arranged on a side of the first antenna close to the second antenna,
wherein a feed point of the second antenna is arranged on a side of the second antenna away from the first feed point, wherein the first radiation branch is grounded on the side of the first antenna away from the first feed point,
wherein an operating frequency band of the first antenna and an operating frequency band of the second antenna each comprise a first frequency band, and A is a wavelength in a medium corresponding to the first frequency band, and
wherein a length of the first radiation branch is an odd multiple of (½)λ.

14. The terminal device of claim 13, further comprising a wireless communication Wi-Fi chip connected to the antenna combination system.

15. The terminal device of claim 13, wherein in a case that the second antenna transmits a signal in the first frequency band, a first signal and a second signal that are different are coupled from the second antenna to the first antenna, and a phase difference between the first signal and the second signal is (180±X)°, wherein X is less than a second preset threshold, and wherein the first signal is a signal coupled to the first antenna through a first path, the second signal is a signal coupled to the first antenna through a second path, the first path is a path to the first feed point through the first radiation branch, and the second path is a path to the first feed point through the first radiation branch.

16. The terminal device of claim 13, wherein the first antenna further comprises a first matching circuit that is configured to perform impedance matching and/or operating frequency tuning on the first antenna, and wherein the second antenna further comprises a second matching circuit that is configured to perform impedance matching and/or operating frequency tuning on the second antenna.

17. The terminal device of claim 13, wherein a side of the first radiation branch away from the first feed point is grounded by a third matching circuit that is configured to adjust a phase of the first signal.

18. The terminal device of claim 13, wherein the first preset threshold is ¼λ.

19. The terminal device of claim 13, wherein the operating frequency band of the second antenna further comprises a second frequency band, and wherein the first antenna comprises a filter circuit that is configured to filter a signal in the second frequency band.

20. The terminal device of claim 13, wherein the first antenna is connected to a first specific absorption rate (SAR) sensor that is configured to reduce a transmit power of the first antenna based on a distance between a living body and the first radiation branch being less than a fourth preset threshold.

* * * * *